US008760482B2

(12) United States Patent
Furukawa

(10) Patent No.: US 8,760,482 B2
(45) Date of Patent: Jun. 24, 2014

(54) INFORMATION PROCESSING APPARATUS, SYSTEM, AND INFORMATION PROCESSING METHOD

(71) Applicant: Takahiro Furukawa, Shizuoka (JP)

(72) Inventor: Takahiro Furukawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/755,422

(22) Filed: Jan. 31, 2013

(65) Prior Publication Data
US 2013/0201271 A1    Aug. 8, 2013

(30) Foreign Application Priority Data

Feb. 3, 2012    (JP) ................. 2012-022349
Dec. 20, 2012   (JP) ................. 2012-278094

(51) Int. Cl.
B41J 2/435    (2006.01)
B41J 2/47     (2006.01)
(52) U.S. Cl.
USPC .......................... 347/237; 347/247
(58) Field of Classification Search
USPC ................ 347/237, 240, 247, 251–254
See application file for complete search history.

(56) References Cited

U.S. PATENT DOCUMENTS 7,463,395 B2    12/2008  Utagawa et al.
8,106,934 B2    1/2012   Ishimi et al.
8,284,226 B2    10/2012  Hasegawa et al.
8,471,885 B2 *  6/2013   Ishimi et al. ............ 347/253
2010/0039916 A1  2/2010  Hasegawa et al.
2012/0162340 A1  6/2012  Furukawa et al.

FOREIGN PATENT DOCUMENTS

| EP | 2154633 | 2/2010 |
| JP | 2003-127446 | 5/2003 |
| JP | 2006-306063 | 11/2006 |
| JP | 3990891 | 10/2007 |
| JP | 2008-179135 | 8/2008 |
| JP | 2011-025647 | 2/2011 |

OTHER PUBLICATIONS

European Search Report dated Apr. 29, 2013 issued in corresponding European Application No. 13153571.8.

* cited by examiner

Primary Examiner — Hai C Pham
(74) Attorney, Agent, or Firm — Harness, Dickey & Pierce, P.L.C.

(57) ABSTRACT

An information processing apparatus generates a scanning instruction to send to a device for forming visible information by scanning a recording medium with a laser beam. The information processing apparatus includes an extracting unit for reading line information in which a scanning speed and a radiation output value of the laser beam are registered in advance for each line, and extracting all lines which are overlapping a target line in a line direction and positioned within a predetermined distance from the target line; and an adjusting unit for performing at least one of removing an extracted line from a scanning object, changing the radiation output value of an extracted line to a value lower than an initial value, and changing the scanning speed of an extracted line to a value greater than an initial value.

16 Claims, 33 Drawing Sheets

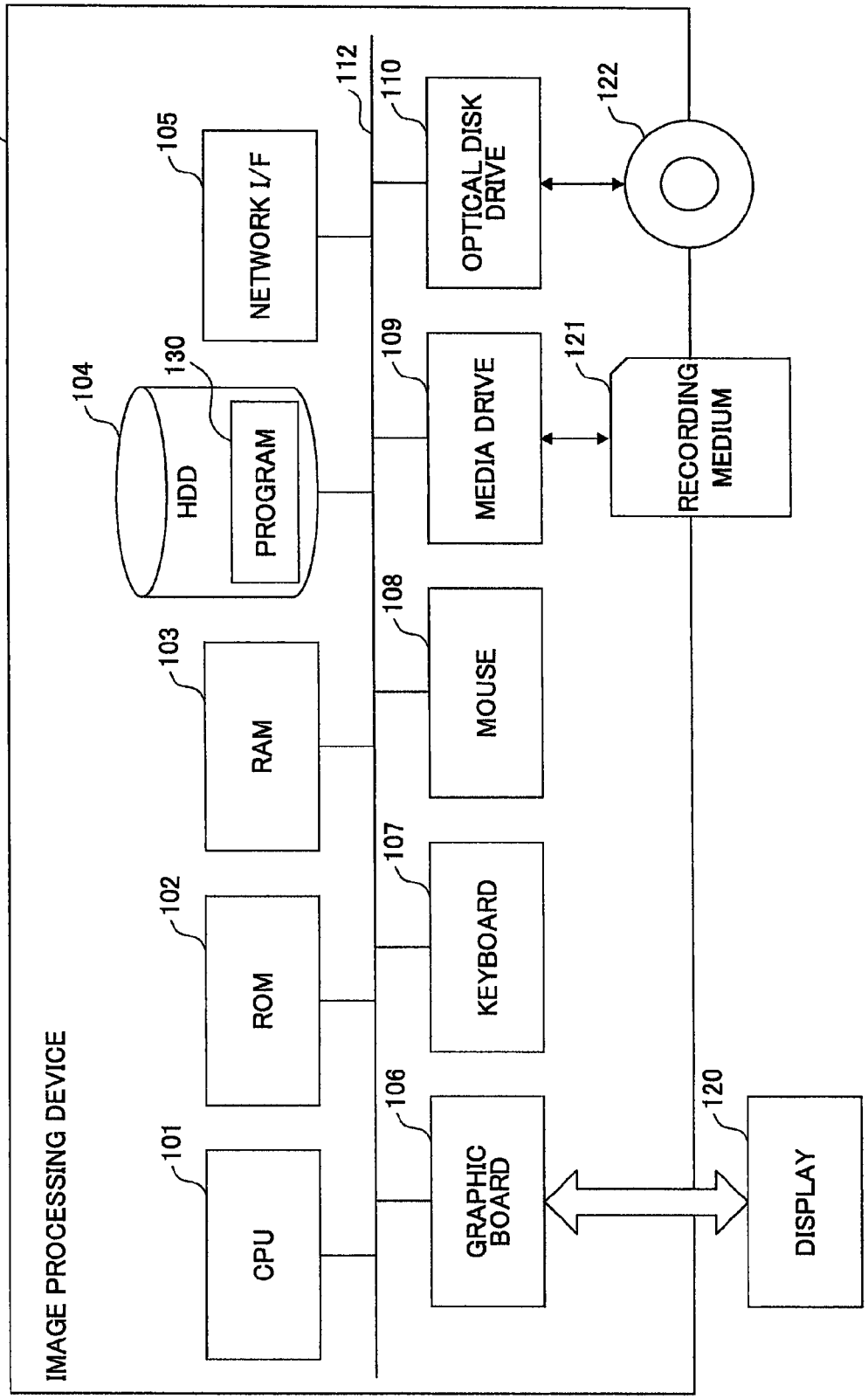

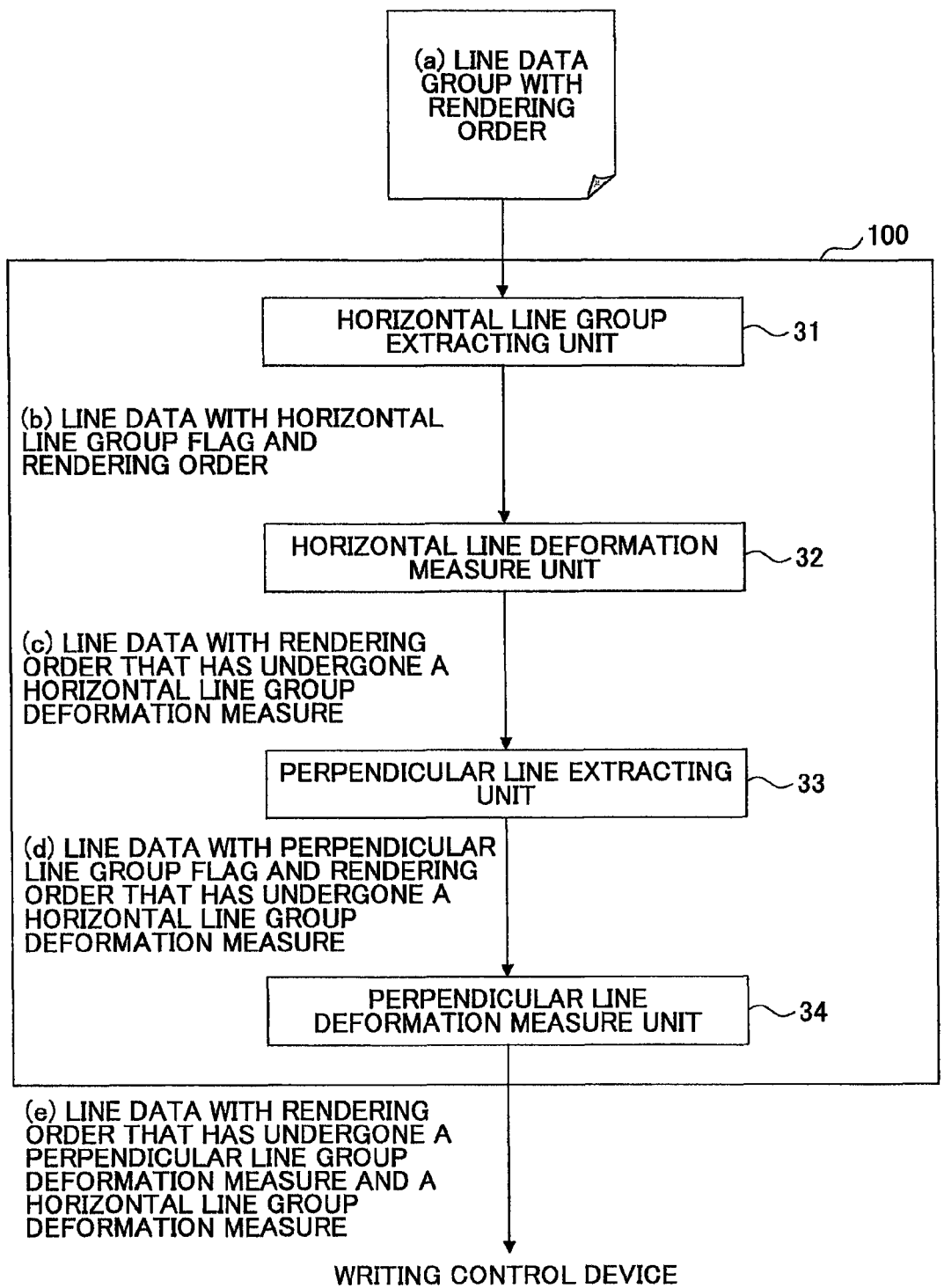

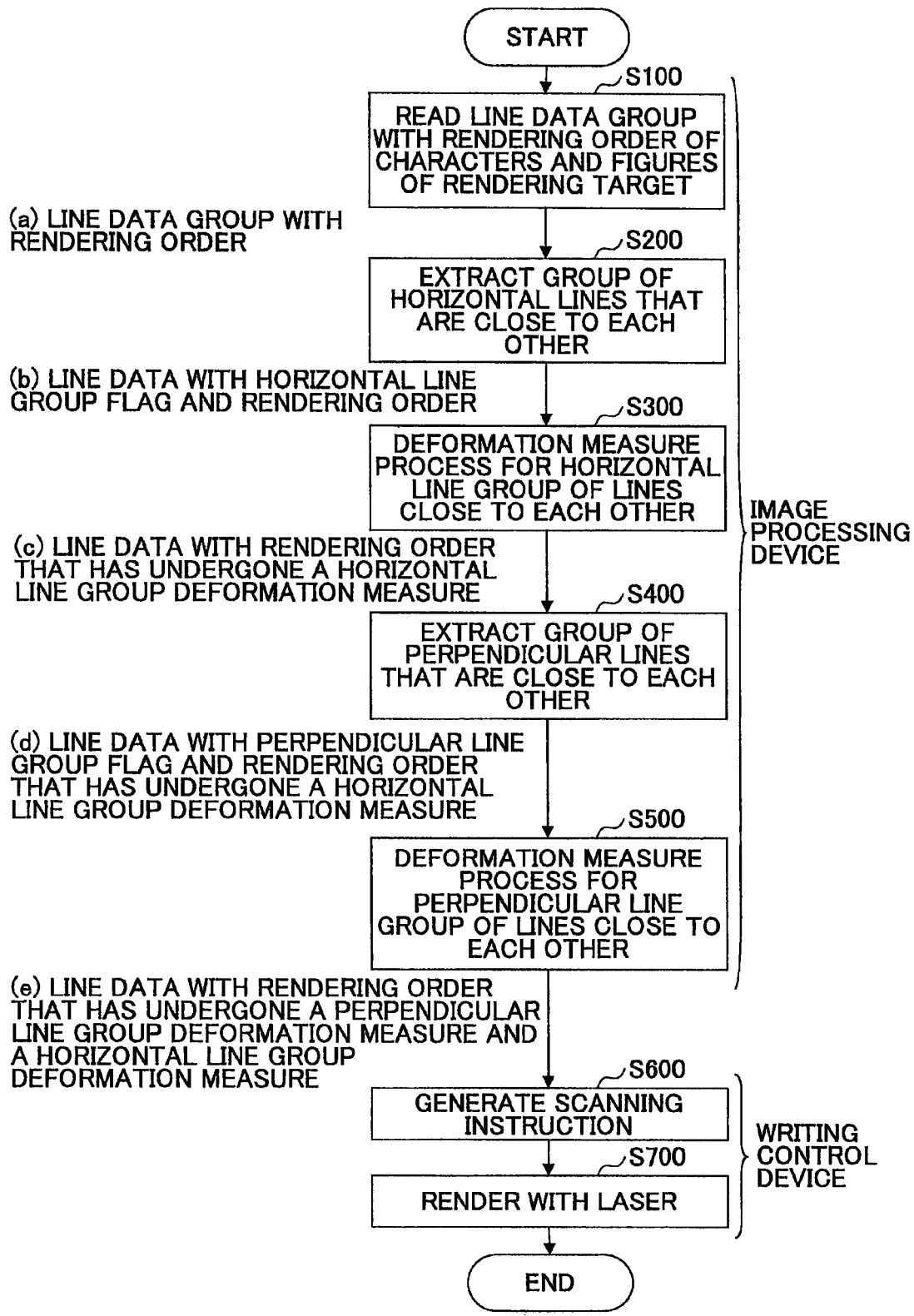

FIG.8

(a) LINE DATA GROUP WITH RENDERING ORDER

| NUMBER OF LINE GROUPS: N |
|---|
| LASER SCANNING SPEED : S |
| LASER POWER VALUE : P |
| START POINT x COORDINATE:xs1 |
| START POINT y COORDINATE:ys1 |
| END POINT x COORDINATE:xe1 |
| END POINT y COORDINATE:ye1 |
| ⋮ |
| LASER SCANNING SPEED : S |
| LASER POWER VALUE : P |
| START POINT x COORDINATE:xsN |
| START POINT y COORDINATE:ysN |
| END POINT x COORDINATE:xeN |
| END POINT y COORDINATE:yeN |

(b) LINE DATA WITH HORIZONTAL LINE GROUP FLAG AND RENDERING ORDER

| NUMBER OF LINE GROUPS: N |
|---|
| NAME OF LINE : A1 |
| LASER SCANNING SPEED : S |
| LASER POWER VALUE : P |
| HORIZONTAL ON/OFF FLAG : |
| START POINT x COORDINATE:xs1 |
| START POINT y COORDINATE:ys1 |
| END POINT x COORDINATE:xe1 |
| END POINT y COORDINATE:ye1 |

WHEN ON →

| NON-RENDER CANDIDATE FLAG FOR A1 : |
|---|
| NON-RENDER CANDIDATE FLAG FOR A2 : |
| ⋮ |
| NON-RENDER CANDIDATE FLAG FOR AN : |

| NAME OF LINE : Ak |
|---|
| LASER SCANNING SPEED : S |
| LASER POWER VALUE : P |
| HORIZONTAL ON/OFF FLAG : |
| START POINT x COORDINATE:xsk |
| START POINT y COORDINATE:ysk |
| END POINT x COORDINATE:xek |
| END POINT y COORDINATE:yek |

WHEN ON →

| NON-RENDER CANDIDATE FLAG FOR A1 : |
|---|
| NON-RENDER CANDIDATE FLAG FOR A2 : |
| ⋮ |
| NON-RENDER CANDIDATE FLAG FOR AN : |

| NAME OF LINE : AN |
|---|
| LASER SCANNING SPEED : S |
| LASER POWER VALUE : P |
| HORIZONTAL ON/OFF FLAG : |
| START POINT x COORDINATE:xsN |
| START POINT y COORDINATE:ysN |
| END POINT x COORDINATE:xeN |
| END POINT y COORDINATE:yeN |

WHEN ON →

| NON-RENDER CANDIDATE FLAG FOR A1 : |
|---|
| NON-RENDER CANDIDATE FLAG FOR A2 : |
| ⋮ |
| NON-RENDER CANDIDATE FLAG FOR AN : |

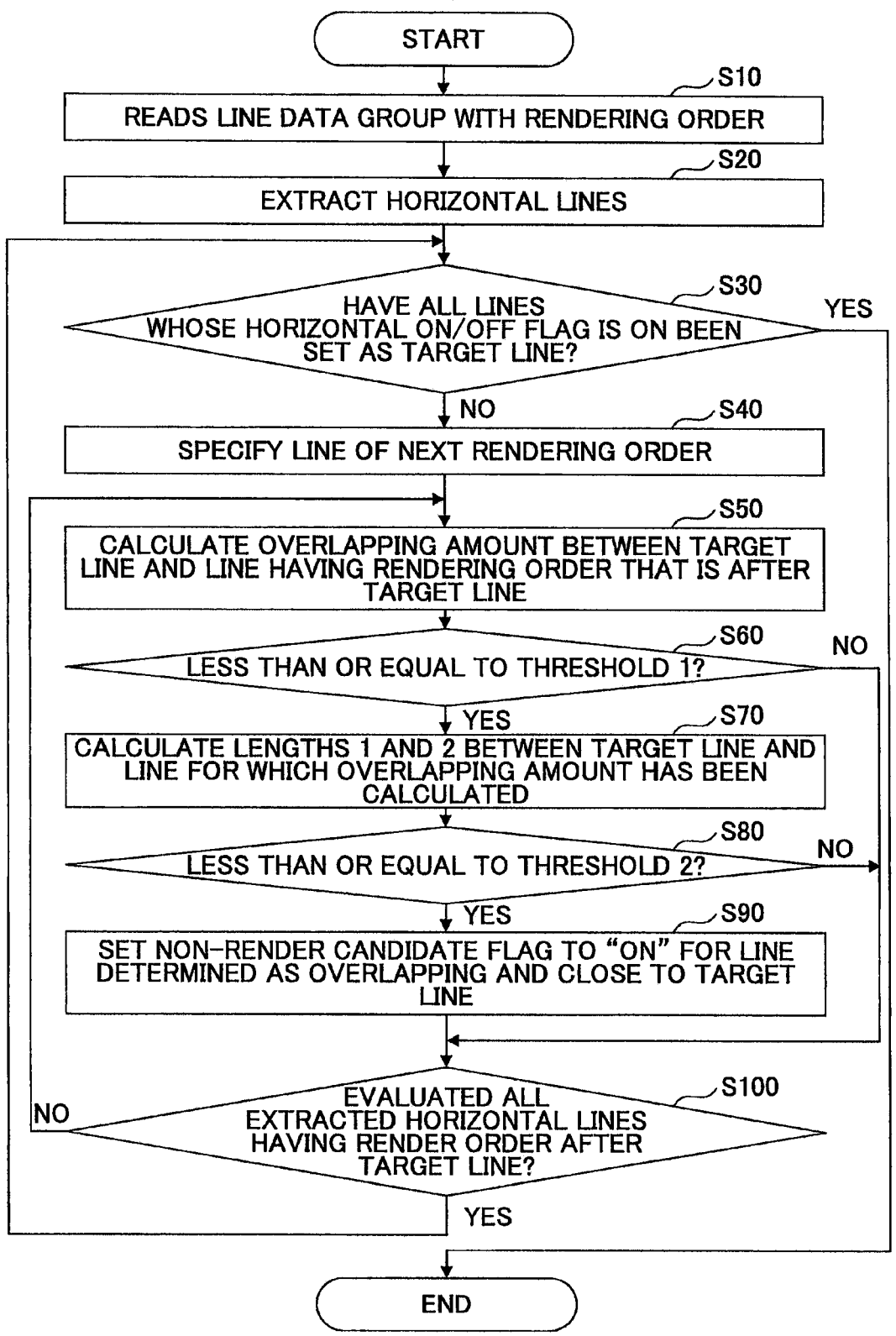

FIG.11A

LINE DATA FOR LINE A1

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

FIG.11B

LINE DATA FOR LINE A1

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| |
|---|
| NON-RENDER CANDIDATE FLAG FOR A1:OFF→ON |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3

| |
|---|
| NON-RENDER CANDIDATE FLAG FOR A1:OFF→ON |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

FIG.12A

LINE DATA FOR LINE A1

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| NON-RENDER CANDIDATE FLAG FOR A1:ON |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3

| NON-RENDER CANDIDATE FLAG FOR A1:ON |
|---|
| NON-RENDER CANDIDATE FLAG FOR A2:(OFF→ON) |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

FIG.12B

LINE DATA FOR LINE A1

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| NON-RENDER CANDIDATE FLAG FOR A1:ON |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3

| NON-RENDER CANDIDATE FLAG FOR A1:ON |
|---|
| NON-RENDER CANDIDATE FLAG FOR A2:ON |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF→ON |
| NON-RENDER CANDIDATE FLAG FOR A5:OFF |

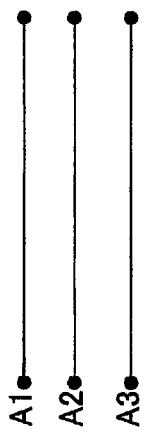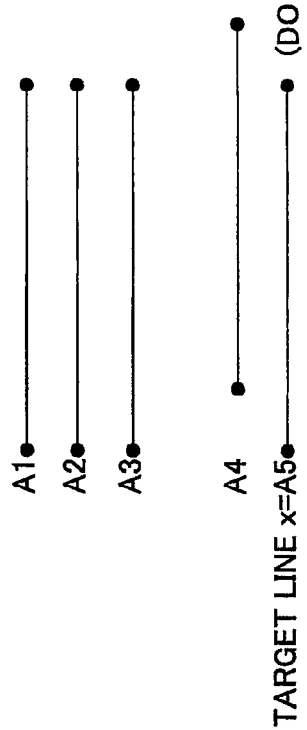

FIG.16A

LINE DATA FOR LINE A1

| |
|---|
| NON-RENDER CANDIDATE FLAG FOR A1: OFF |
| NON-RENDER CANDIDATE FLAG FOR A2: OFF |
| NON-RENDER CANDIDATE FLAG FOR A3: OFF |
| NON-RENDER CANDIDATE FLAG FOR A4: OFF |
| NON-RENDER CANDIDATE FLAG FOR A5: OFF |

LINE DATA FOR LINE A2

| |
|---|
| NON-RENDER CANDIDATE FLAG FOR A1: ON |
| NON-RENDER CANDIDATE FLAG FOR A2: OFF |
| NON-RENDER CANDIDATE FLAG FOR A3: OFF |
| NON-RENDER CANDIDATE FLAG FOR A4: OFF |
| NON-RENDER CANDIDATE FLAG FOR A5: OFF |

LINE DATA FOR LINE A3

| |
|---|
| NON-RENDER CANDIDATE FLAG FOR A1 (ON→OFF) |
| NON-RENDER CANDIDATE FLAG FOR A2: ON |
| NON-RENDER CANDIDATE FLAG FOR A3: OFF |
| NON-RENDER CANDIDATE FLAG FOR A4: OFF |
| NON-RENDER CANDIDATE FLAG FOR A5: OFF |

LINE DATA FOR LINE A4

| |
|---|
| NON-RENDER CANDIDATE FLAG FOR A1: OFF |
| NON-RENDER CANDIDATE FLAG FOR A2: OFF |
| NON-RENDER CANDIDATE FLAG FOR A3: OFF |
| NON-RENDER CANDIDATE FLAG FOR A4: OFF |
| NON-RENDER CANDIDATE FLAG FOR A5: OFF |

LINE DATA FOR LINE A5

| |
|---|
| NON-RENDER CANDIDATE FLAG FOR A1: OFF |
| NON-RENDER CANDIDATE FLAG FOR A2: OFF |
| NON-RENDER CANDIDATE FLAG FOR A3: OFF |
| NON-RENDER CANDIDATE FLAG FOR A4: ON |
| NON-RENDER CANDIDATE FLAG FOR A5: OFF |

FIG.16B

LINE DATA FOR LINE A1

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| |
|---|
| NON-RENDER CANDIDATE FLAG FOR A1:ON |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3 (LASER POWER DECREASED)

| |
|---|
| NON-RENDER CANDIDATE FLAG FOR A1:OFF |
| NON-RENDER CANDIDATE FLAG FOR A2:ON→OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5

| |
|---|
| NON-RENDER CANDIDATE FLAG FOR A1:OFF |
| NON-RENDER CANDIDATE FLAG FOR A2:OFF |
| NON-RENDER CANDIDATE FLAG FOR A3:OFF |
| NON-RENDER CANDIDATE FLAG FOR A4:ON |
| NON-RENDER CANDIDATE FLAG FOR A5:OFF |

FIG.17A

LINE DATA FOR LINE A1

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| NON-RENDER CANDIDATE FLAG FOR A1:ON |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3   LASER POWER DECREASED (DO NOTHING)

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:ON |
| NON-RENDER CANDIDATE FLAG FOR A5:OFF |

FIG.17B

LINE DATA FOR LINE A1

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| NON-RENDER CANDIDATE FLAG FOR A1:ON |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3   LASER POWER DECREASED

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5 (LASER POWER DECREASED)

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:ON→OFF |
| NON-RENDER CANDIDATE FLAG FOR A5:OFF |

FIG.18

LINE DATA FOR LINE A1

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A2

| NON-RENDER CANDIDATE FLAG FOR A1:ON |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A3   LASER POWER DECREASED

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A4

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

LINE DATA FOR LINE A5   LASER POWER DECREASED   (DO NOTHING)

| NON-RENDER CANDIDATE FLAG FOR A1:OFF |
|---|
| NON-RENDER CANDIDATE FLAG FOR A2:OFF |
| NON-RENDER CANDIDATE FLAG FOR A3:OFF |
| NON-RENDER CANDIDATE FLAG FOR A4:OFF |
| NON-RENDER CANDIDATE FLAG FOR A5:OFF |

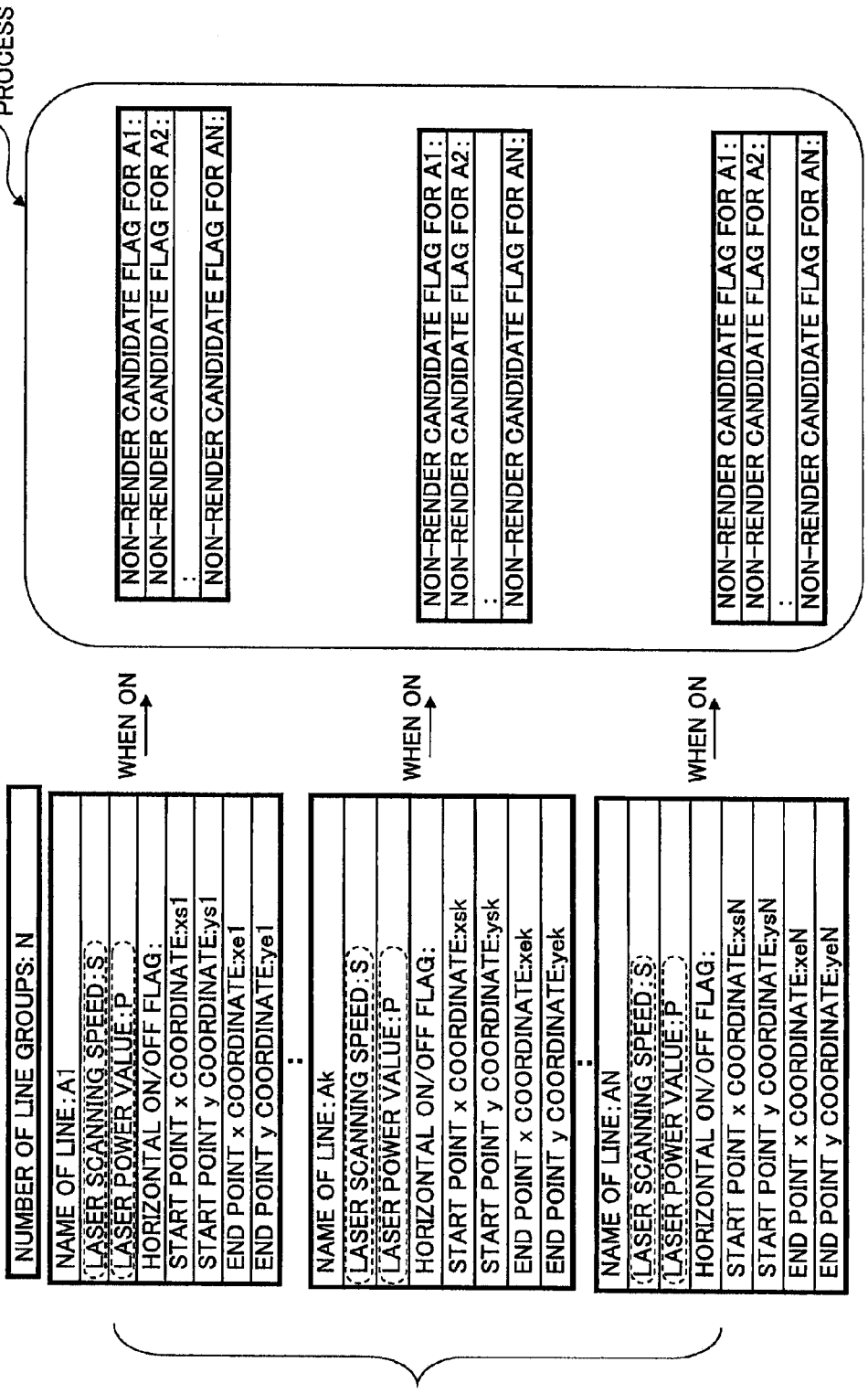
FIG.19 (c) LINE DATA WITH RENDERING ORDER THAT HAS UNDERGONE A HORIZONTAL LINE GROUP DEFORMATION MEASURE

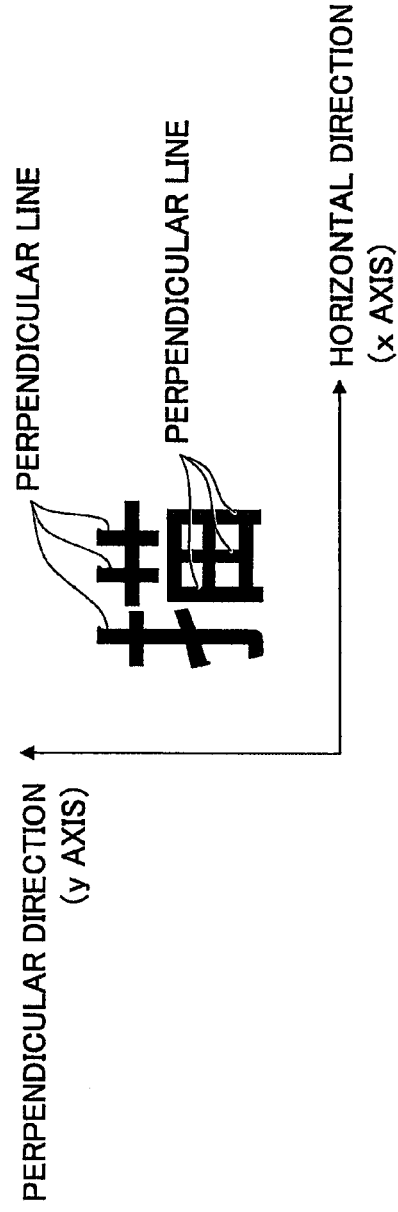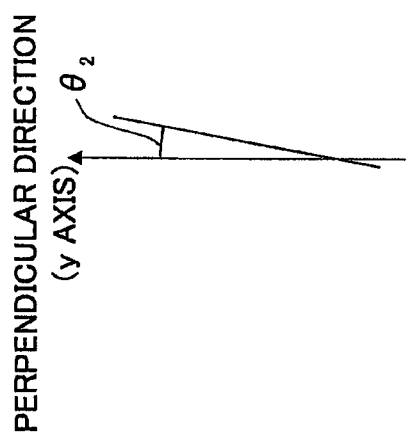
FIG.20A
FIG.20B

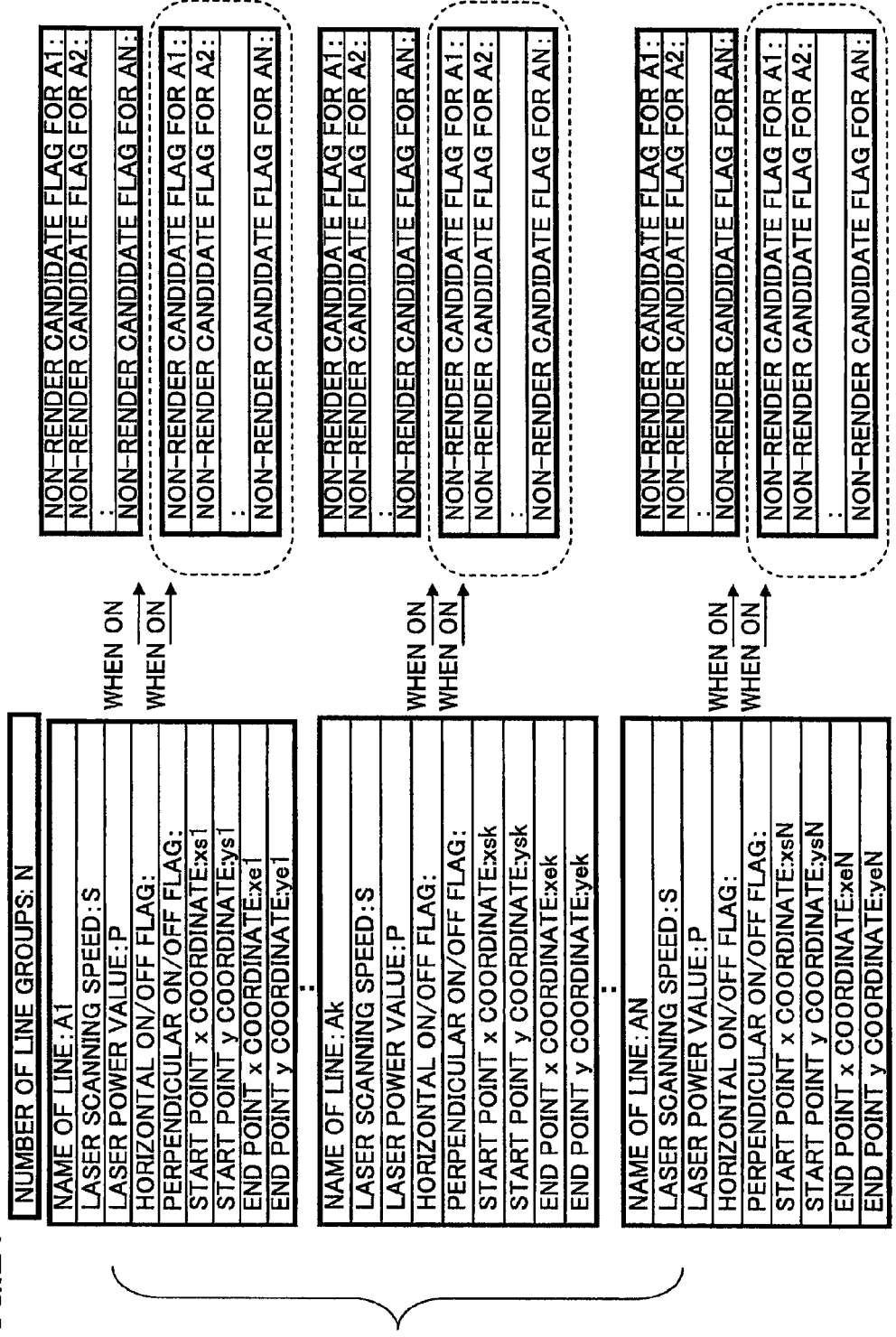
FIG.21 (d) LINE DATA WITH PERPENDICULAR LINE GROUP FLAG AND RENDERING ORDER THAT HAS UNDERGONE A HORIZONTAL LINE GROUP DEFORMATION MEASURE

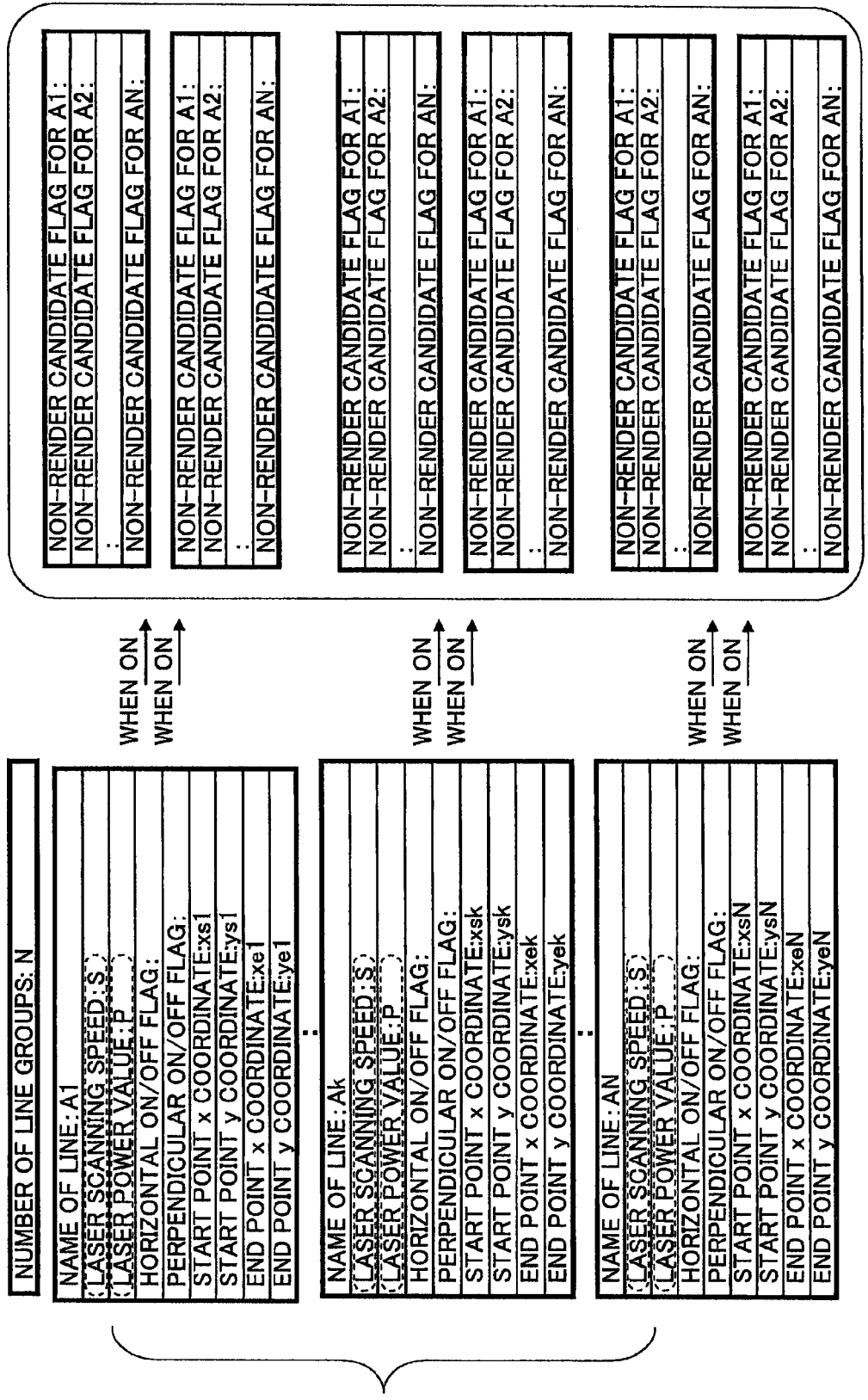
FIG. 22(e) LINE DATA WITH RENDERING ORDER THAT HAS UNDERGONE A PERPENDICULAR LINE GROUP DEFORMATION MEASURE AND A HORIZONTAL LINE GROUP DEFORMATION MEASURE

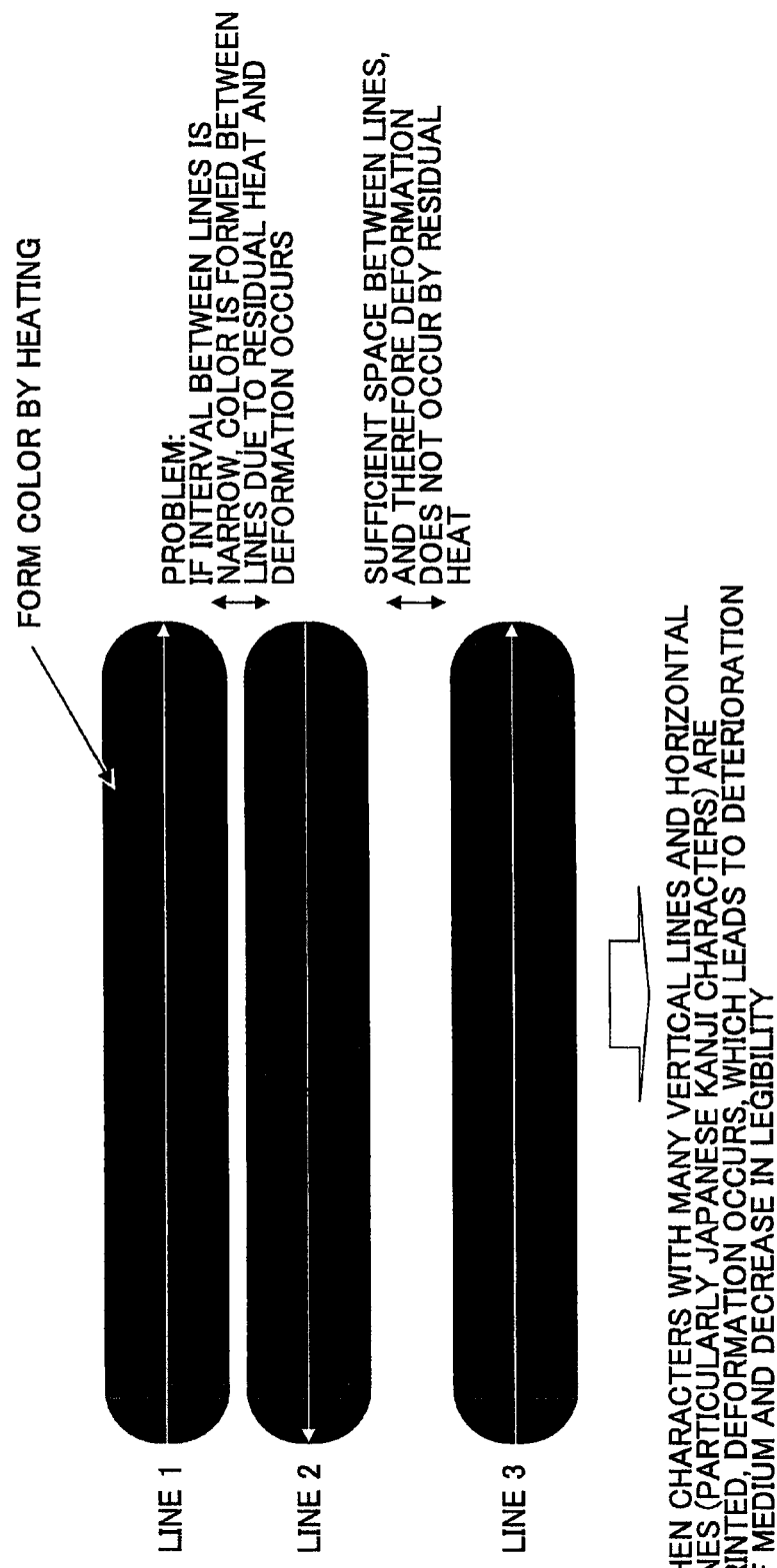

INFORMATION PROCESSING APPARATUS, SYSTEM, AND INFORMATION PROCESSING METHOD

BACKGROUND OF THE INVENTION

1. Field of the Invention

The present invention relates to an information processing apparatus for generating a scanning instruction for visible information which is formed on a recording medium by scanning a laser.

2. Description of the Related Art

A technology of writing characters and symbols onto a medium such as a paper sheet with a laser is put in practical use. As it has become possible to render characters on a medium such as a sheet, it has become easy to render characters onto labels of containers at factories. Furthermore, rewritable type heat-sensitive paper (hereinafter, "rewritable paper") on which rendering and erasing can be repeatedly performed, is put in practical use. For example, considering a container used in physical distribution, the destination of the same container may not always be the same, and therefore if characters on a label are erased and new characters are rendered while the label remains pasted on the container, the need of replacing labels can be significantly reduced.

However, rewritable paper is characterized in that a color is erased by heat of a certain temperature, and a color appears when heat of a higher temperature is applied. However, when excessive thermal load is applied, the rewritable paper becomes altered, and deterioration may occur, such as the shelf life may be reduced or the erasing may not be completely performed. Excessive thermal load is applied when heat is additionally applied to a part that already has high temperature. On a label, excessive thermal load is apt to be applied at parts where characters and symbols intersect or where adjacent parallel lines are formed for filling in an area.

FIG. 24 illustrates an example of a character rendered on rewritable paper. In FIG. 24, a Japanese katakana character "nu" is rendered. The Japanese character "nu" includes a turning edge point 320 and an intersection point 310. At the intersection point 310, the laser is radiated again at the same position while there is remaining heat of the stroke rendered immediately before the present stroke, and therefore the temperature of the intersection point 310 is further increased. Furthermore, at the turning edge point 320, due to the impact of the inertia of the mirror for controlling the direction of radiating a laser, the laser is radiated for a relatively long time, and therefore the temperature at the turning edge point 320 increases.

Accordingly, when a laser radiating device radiates a laser beam on rewritable paper, there are cases where control is implemented to prevent an excessive thermal load from being applied (see, for example, Patent Documents 1 through 3). Patent document 1 discloses a recording method of scanning a laser beam so that a subsequent line is rendered after passing the line previously rendered, at portions where lines overlap each other. Patent Document 2 discloses a record erasing device for reducing at least one of the power and the radiating time of the laser beam radiated onto an intersecting render point when there are two lines that intersect each other. Patent Document 3 discloses a recording method by intersection point removal, which involves not radiating a laser beam for one of overlapping render lines at a portion where render lines of a character overlap.

On rewritable paper, at portions other than portions where a laser beam has been radiated, a color may also be formed due to residual heat.

FIG. 25 illustrates the impact of residual heat when the intervals between lines are narrow. Arrows in FIG. 25 indicate the scanning positions and scanning directions of laser beams. The light spots (radiation parts) of laser beams are extremely small, but at portions other than the radiated portions, a color may also be formed due to residual heat. As shown in FIG. 25, the space between line 1 and line 2 is narrower than the space between line 2 and line 3. When a space is as narrow as the space between line 1 and line 2, the lines contact each other due to residual heat, which reduces the legibility of the render object. Furthermore, the temperature may increase at the portions where color is formed due to the residual heat of the two lines.

Patent Document 1: Japanese Laid-Open Patent Publication No. 2006-306063
Patent Document 2: Japanese Patent No. 3990891
Patent Document 3: Japanese Laid-Open Patent Publication No. 2008-179135

SUMMARY OF THE INVENTION

The present invention provides an information processing apparatus, a system, and an information processing method, in which one or more of the above-described disadvantages are eliminated.

A preferred embodiment of the present invention provides an information processing apparatus, a system, and an information processing method, by which colors are prevented from being formed due to residual heat between lines, so that the legibility is improved or deterioration of the rendering medium is prevented.

According to an aspect of the present invention, there is provided an information processing apparatus for generating a scanning instruction to send to a device for forming visible information by scanning a recording medium with a laser beam, the information processing apparatus including a line extracting unit configured to read line information in which a scanning speed and a radiation output value of the laser beam are registered in advance for each of a plurality of lines, and extract, from the line information, all lines which are overlapping a target line in a line direction and which are positioned within a predetermined distance from the target line; and a scanning line adjusting unit configured to perform at least one of removing, from a scanning object, at least one of the lines extracted by the line extracting unit, changing the radiation output value of at least one of the lines extracted by the line extracting unit to a value lower than an initial value, and changing the scanning speed of at least one of the lines extracted by the line extracting unit to a value greater than an initial value.

According to an aspect of the present invention, there is provided an information processing method performed by an information processing apparatus for generating a scanning instruction to send to a device for forming visible information by scanning a recording medium with a laser beam, the information processing method including reading line information in which a scanning speed and a radiation output value of the laser beam are registered in advance for each of a plurality of lines; extracting, from the line information, all lines which are overlapping a target line in a line direction and which are positioned within a predetermined distance from the target line; and performing at least one of removing, from a scanning object, at least one of the lines extracted at the extracting, changing the radiation output value of at least one of the lines extracted at the extracting to a value lower than an initial value, and changing the scanning speed of at least one of the lines extracted at the extracting to a value greater than an initial value.

According to an aspect of the present invention, there is provided a system for forming visible information by irradiating a recording medium with a laser beam, the system including a line extracting unit configured to read line information in which a scanning speed and a radiation output value of the laser beam are registered in advance for each of a plurality of lines, and extract, from the line information, all lines which are overlapping a target line in a line direction and which are positioned within a predetermined distance from the target line; a scanning line adjusting unit configured to perform at least one of removing, from a scanning object, at least one of the lines extracted by the line extracting unit, changing the radiation output value of at least one of the lines extracted by the line extracting unit to a value lower than an initial value, and changing the scanning speed of at least one of the lines extracted by the line extracting unit to a value greater than an initial value; and a laser radiating device configured to radiate the laser beam from a starting end to an ending end of a line based on the line information.

BRIEF DESCRIPTION OF THE DRAWINGS

Other objects, features and advantages of the present invention will become more apparent from the following detailed description when read in conjunction with the accompanying drawings, in which:

FIG. 4A is a hardware block diagram of the image processing device;

FIG. 5 is a functional block diagram of the image processing device;

FIG. 6 is a flowchart of a procedure for performing horizontal and perpendicular deformation measures by the image processing apparatus;

FIG. 8 illustrates a line data group with horizontal line group flag and rendering order;

FIG. 9 is a flowchart of a procedure of setting a non-render candidate flag to "ON" performed by a horizontal line group extracting unit;

FIGS. 11A through 12B are transition diagrams of the non-render candidate flag;

FIGS. 14A through 15B illustrate the setting of non-render candidate flags in the case of using the line data in FIG. 10;

FIGS. 16A through 18 illustrate the transition of main parts of line data with rendering order;

FIG. 19 illustrates an example of the line data with rendering order that has undergone a horizontal line group deformation measure;

FIGS. 20A through 20D illustrate the extraction of perpendicular lines that are overlapping in the perpendicular (vertical) direction and close to each other, from line data;

FIG. 21 illustrates an example of line data with perpendicular line group flag and rendering order that has undergone a horizontal line group deformation measure;

FIG. 22 illustrates an example of line data with rendering order that has undergone a perpendicular line group deformation measure and a horizontal line group deformation measure;

FIG. 25 illustrates the impact of residual heat when the intervals between lines are narrow.

DETAILED DESCRIPTION OF THE PREFERRED EMBODIMENTS

A description is given, with reference to the accompanying drawings, of embodiments of the present invention.

Figure 1:
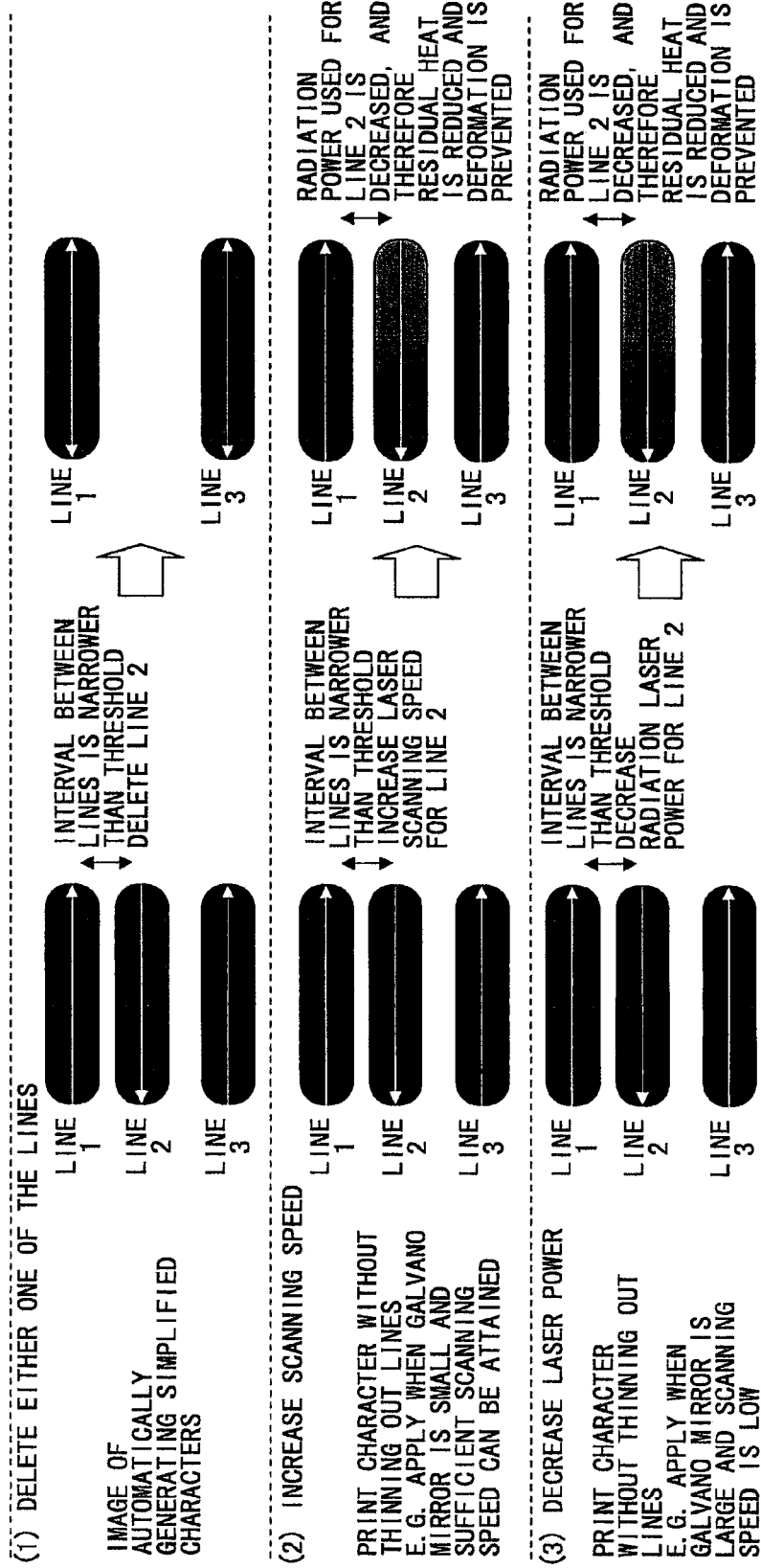
FIG. 1 illustrates the generation of a scanning instruction by an image processing apparatus according to the present embodiment.

FIG. 1 illustrates the generation of a scanning instruction by an image processing apparatus according to the present embodiment. The image processing apparatus performs one or more of the following three operations.

(1) When the length between lines is less than a threshold, the image processing apparatus deletes one of the two lines. In the example of FIG. 1, the space between line 1 and line 2 is less than a threshold, and therefore line 2 is deleted (simplified characters are mechanically created). Since line 2 is not rendered, line 1 and line 2 are surely prevented from contacting each other due to residual heat. Hereinafter, this method may be referred to as "thinning out lines". Furthermore, a case where lines contact each other may be referred to as "deformation".

(2) When the length between lines is less than a threshold, the image processing apparatus increases the laser scanning speed for one of the two lines. In the example of FIG. 1, the space between line 1 and line 2 is less than a threshold, and therefore the laser scanning speed for line 2 is increased. As the radiation time of the laser beam is reduced, the accumulated heat is reduced, and the lines are less likely to contact each other due to residual heat. By this method, the lines are not thinned out, and therefore the shape of a character, etc., can be maintained. This method is effective in a case where a galvano mirror described below is small and the scanning speed can be sufficiently increased.

(3) When the length between lines is less than a threshold, the image processing apparatus reduces the laser power when rendering one of the two lines. In the example of FIG. 1, the space between line 1 and line 2 is less than a threshold, and therefore the laser power is reduced when rendering line 2. As the laser power is reduced, the accumulated heat is reduced, and the lines are less likely to contact each other due to residual heat. By this method, the lines are not thinned out, and therefore the shape of a character, etc., can be maintained. This method is effective in a case where a galvano mirror described below is large and the scanning speed is low.

System Configuration

Figure 2:
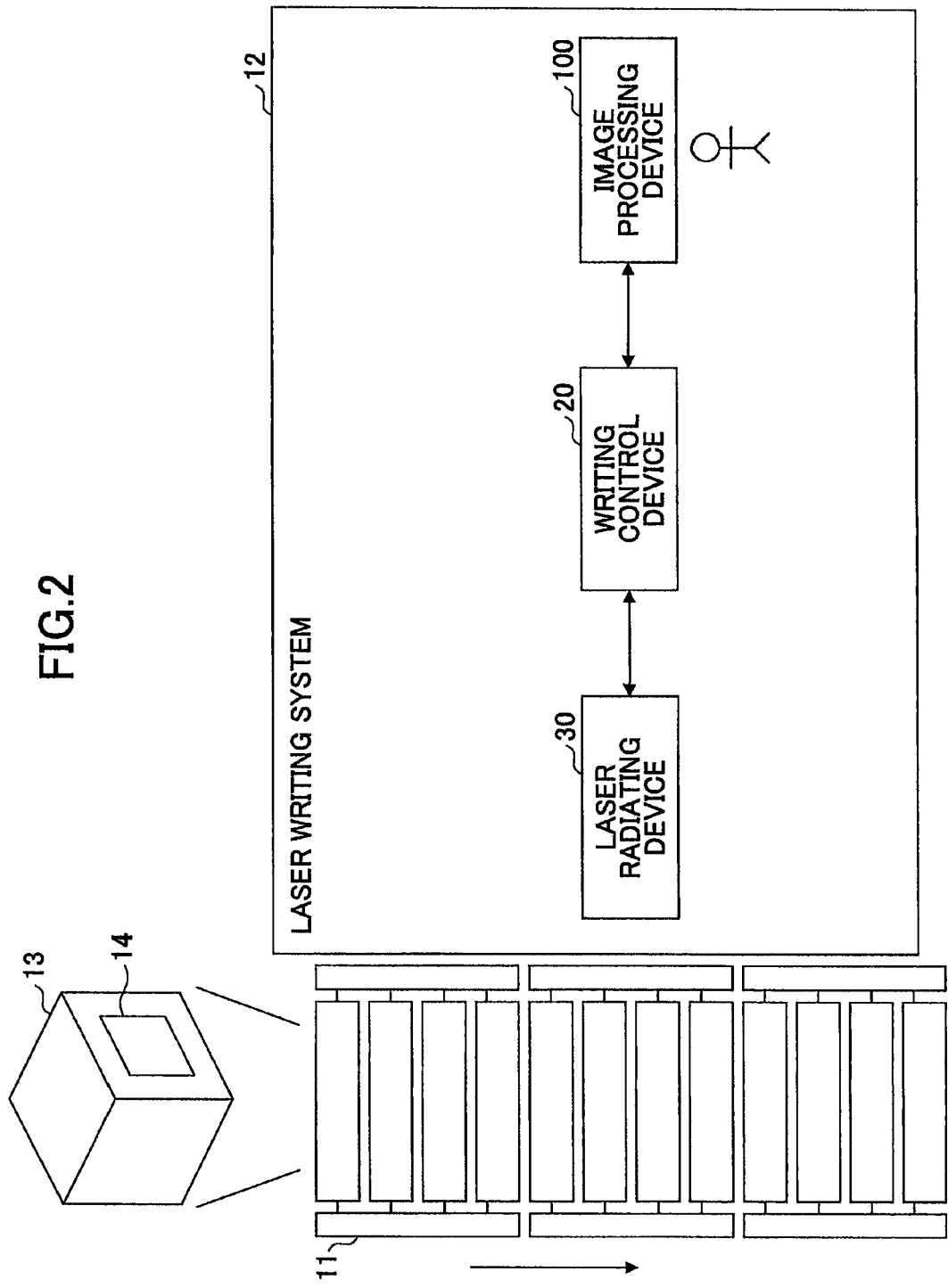
FIG. 2 schematically illustrates a laser writing system.

FIG. 2 schematically illustrates a laser writing system 12. As shown in FIG. 2, a container 13 is moving on a conveyer 11. On the container 13, rewritable paper 14 is attached (fixed), pasted, or detachably held. On the conveying path formed by the conveyer 11, the laser writing system 12 is located at a position facing the rewritable paper 14. The laser writing system 12 detects, by a sensor, that the container 13 is passing, and renders characters, numbers, symbols, figures, etc. (hereinafter, may simply be referred to as "characters") on the rewritable paper 14 that is a label.

The laser writing system 12 includes a laser radiating device 30, a writing control device 20, and an image processing device 100. The image processing device 100 generates line data that has not been disfigured or reduced. Furthermore, the image processing device 100 receives a user operation, provides line data of a label to the writing control device 20, and requests rendering. The writing control device 20 generates a scanning instruction from the line data of the label, radiates a laser by controlling the laser radiation position based on the scanning instruction, and renders characters on the rewritable paper 14. The rolls of the image processing device 100 and the writing control device 20 do not need to be clearly separated. Furthermore, the writing control device 20 and the image processing device 100 may constitute a single device. Furthermore, some of the functions of the writing control device 20 may be implemented by the image processing device 100. Thus, the embodiment illustrated in FIG. 1 is one example.

Figure 3:
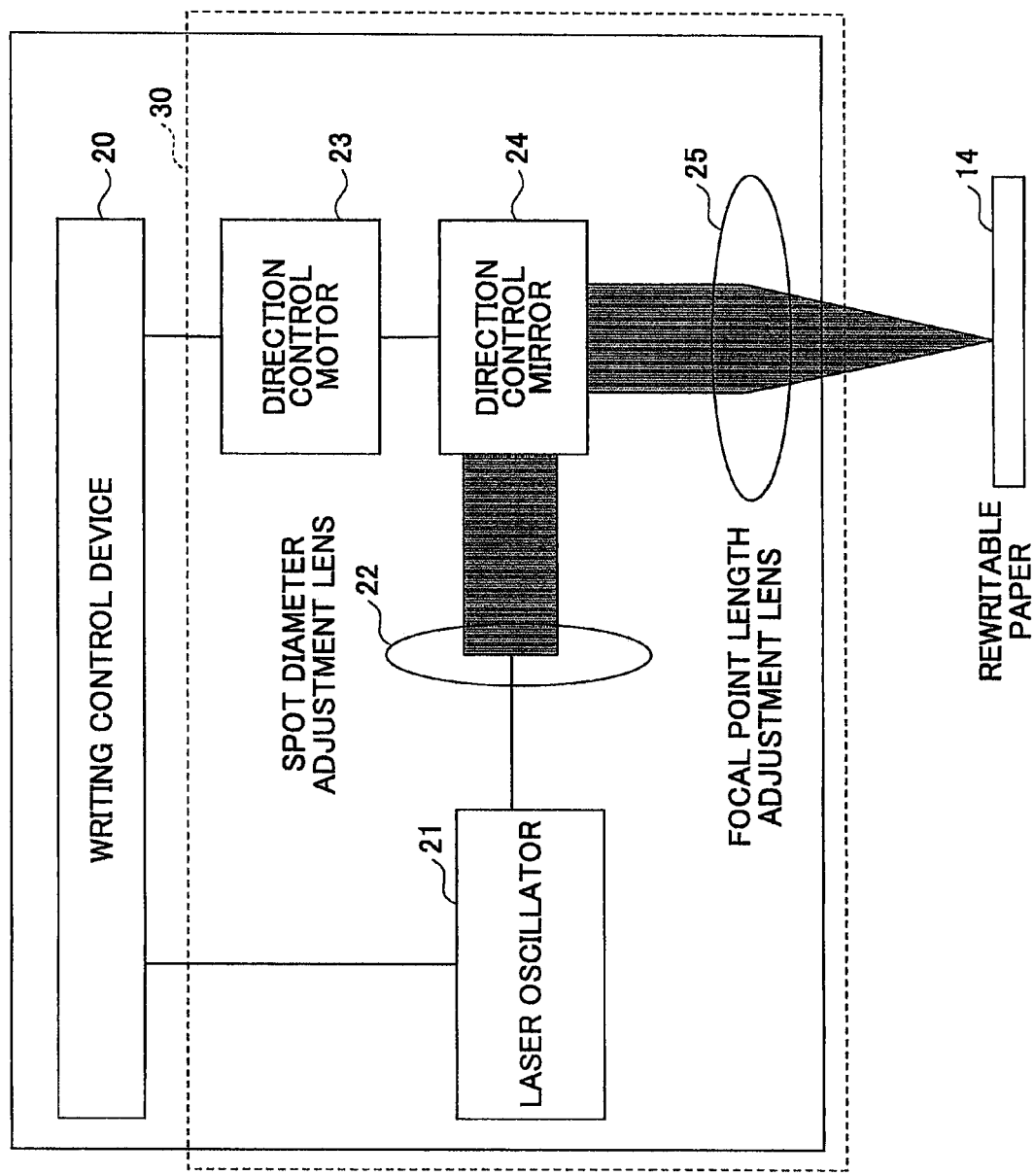
FIG. 3 illustrates a hardware configuration of a laser radiating device connected to the writing control device.

FIG. 3 illustrates a hardware configuration of the laser radiating device 30 connected to the writing control device 20. The laser radiating device 30 includes a laser oscillator 21 for radiating a laser, a direction control mirror 24 for changing the direction of radiating a laser, a direction control motor 23 for driving the direction control mirror 24, a spot diameter adjustment lens 22, and a focal point length adjustment lens 25.

The laser oscillator 21 is a semiconductor laser (LD (Laser Diode)), but may be a gas laser, a solid laser, or a liquid laser. The direction control motor 23 is, for example, a servo motor for biaxially controlling the direction of the reflecting surface of the direction control mirror 24. The direction control motor 23 and the direction control mirror 24 constitute a galvano mirror. The spot diameter adjustment lens 22 is for adjusting the spot diameter of a laser beam, and the focal point length adjustment lens 25 converges the laser beam and adjusts the focal point length.

The rewritable paper 14 is constituted by four layers including, from the surface toward the depth direction, a protection layer, a recording layer constituted by a heat reversible film, a base material layer, and a back coat layer. The rewritable paper 14 is constituted to have flexibility as well as a certain amount of strength, and can be repeatedly used. Although the rewritable paper 14 is referred to as "paper", the rewritable paper 14 may be formed not only of vegetable fiber, or may not include vegetable fiber at all.

Part of the rewritable paper 14 includes a rewritable display area as a reversible display area in which contents can be rewritten. The rewritable display area is constituted by a reversible heat-sensitive recording medium such as a heat reversible (thermo-chromic) film. The reversible heat-sensitive recording medium has a format in which the transparency reversibly changes depending on the temperature and a format in which the color reversibly changes depending on the temperature.

In the present embodiment, a heat recording medium is used, in which the color reversibly changes depending on the temperature. More specifically, in the present embodiment, a heat reversible film is used, which realizes a rewritable property by including leuco dye and a developer in the recording layer. That is to say, color is formed by heating the medium at a temperature of greater than or equal to a fusing point (for example, approximately 180° C.) in a state where the color is erased, and then rapidly cooling the medium from a fused state where the leuco dye and developer are mixed. In this case, the leuco dye and developer are agglomerated while being combined, and form a state where the leuco dye and developer are aggregated in a relatively orderly state, so that the state where the color is formed is fixed.

Meanwhile, a color is erased by heating the medium again at a temperature by which the formed color is not fused (for example, 130° C. through 170° C.). In this case, the assembled state of the formed color is disassembled, and the developer individually crystallizes and separates from the leuco dye, so that the color is erased.

Leuco dye is a colorless or light-colored dye precursor, and is not particularly limited and may be appropriately selected from dye precursors that are conventionally known.

The image processing device 100 according to the present embodiment can render contents on a rewritable recording medium by good color-forming qualities. However, the image processing device 100 can also render contents on a recording medium that is not rewritable, such as heat-sensitive paper that is a recording medium from which the rendered contents are hard to erase (write once recording medium). The rendering speed and the laser output are set according to the sensitivity of the recording medium. There is an appropriate rendering speed and an appropriate laser output for a rewritable recording medium, and there is an appropriate rendering speed and an appropriate laser output for a recording medium that is not rewritable. The method of setting a control instruction according to the present embodiment can be appropriately applied within the range of an appropriate rendering speed and an appropriate laser output for a recording medium that is not rewritable. Furthermore, even if there is no recording medium, it is possible to radiate a laser.

The method of generating a scanning instruction according to the present embodiment is also applicable to a medium other than a rewritable recording medium.

FIG. 4A is a hardware block diagram of the image processing device 100. A typical information processing apparatus may be used as the image processing device 100. As the information processing apparatus, a personal computer, a workstation, and a tablet PC are known; the information processing apparatus may be referred to as any of these.

The image processing device 100 includes a CPU 101, a ROM 102, a RAM 103, a HDD 104, a network I/F 105, a graphic board 106, a keyboard 107, a mouse 108, a media drive 109, and an optical disk drive 110. The CPU 101 executes a program 130 stored in the HDD 104 and controls the operations of the entire image processing device 100. The ROM 102 stores IPL (Initial Program Loader) and static data. The RAM 103 is used as a work area when the CPU 101 executes the program 130.

The HDD 104 stores the program 130 and the OS executed by the CPU 101. The program 130 is used by the image processing device 100 for generating "(e) line data with rendering order that has undergone a perpendicular line group deformation measure and a horizontal line group deformation measure" described below. The network I/F 105 is, for example, an Ethernet card (registered trademark) for connecting to a network, and mainly provides processes of layers 1 and 2. The processes for layers 3 and above are provided by protocol stacks of TCP/IP and programs included in the OS.

The graphic board 106 interprets rendering commands written into the RAM 103 by the CPU 101, and displays various information items on a display 120, such as windows, menus, a cursor, characters, and images.

The keyboard 107 includes plural keys for entering characters, numbers, and various instructions, and receives operations of the user and reports the operations to the CPU 101. Similarly, the mouse 108 receives operations of the user such as moving the cursor, selecting a process target from a menu, and inputting process contents.

The media drive 109 controls the reading or writing (storing) of data with respect to a recording medium 121 such as a flash memory. The optical disk drive 110 controls the reading or writing of various kinds of data with respect to an optical medium 122 that is a removable recording medium such as a Blu-ray disk, a compact disk, and a DVD (Digital Versatile Disk). Furthermore, a bus line 112 such as an address bus and a data bus for electrically connecting the above elements is provided.

The program 130 is a file having an installable format or an executable format, and is distributed by being recorded in the computer-readable recording medium 121 or optical medium 122. Furthermore, the program 130 may be distributed to the image processing device 100 from a server (not shown), in a file having an installable format or an executable format.

Figure 4B:
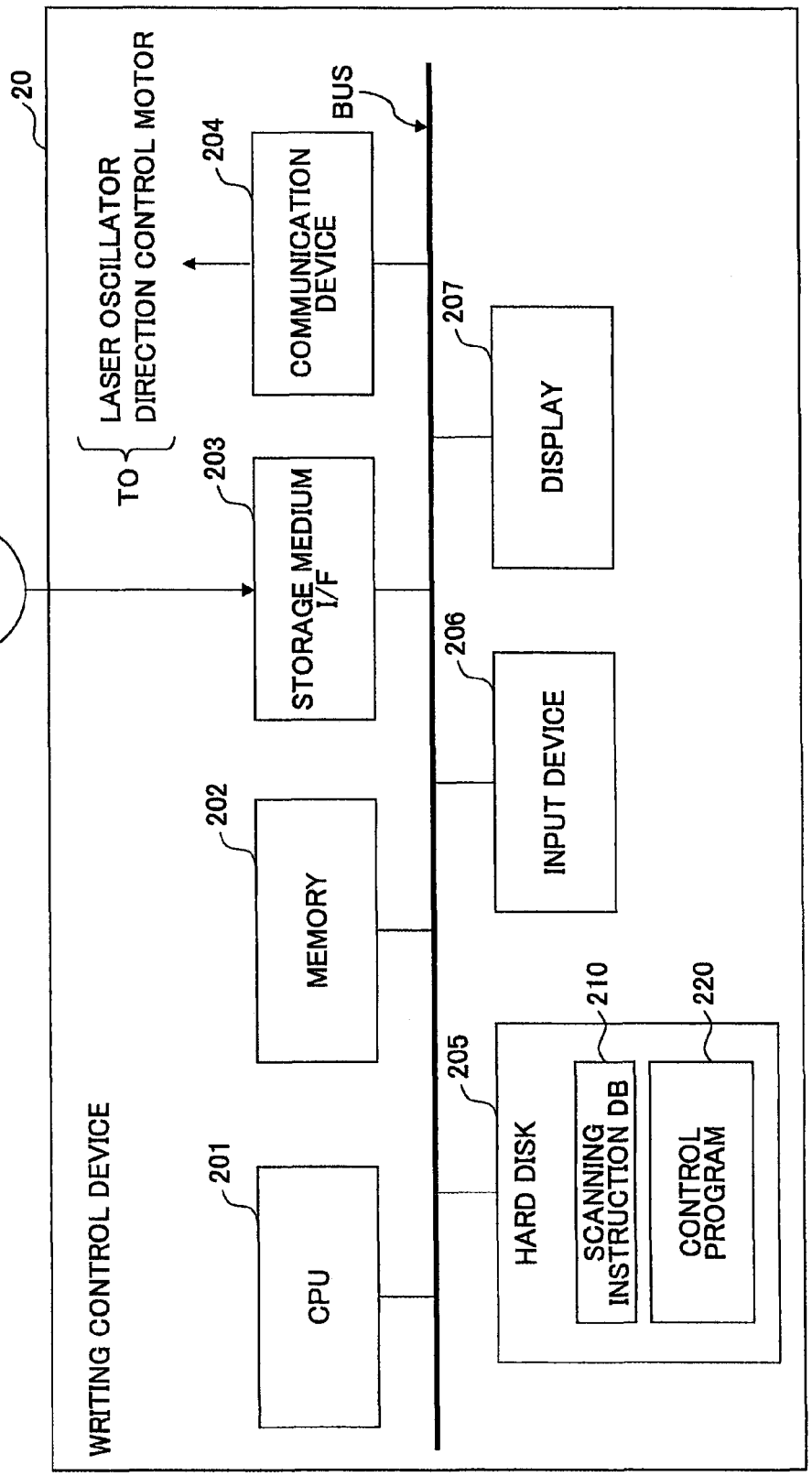
FIG. 4B is a hardware block diagram of the writing control device.

FIG. 4B is a hardware block diagram of the writing control device 20. FIG. 4B is a hardware block diagram of a case where the writing control device 20 is realized mainly by software, and the entity is a computer. When the writing control device 20 is realized without using a computer as an entity, an IC is used, which is generated for a particular function such as ASIC (Application Specific Integrated Circuit).

The writing control device 20 includes a CPU 201, a memory 202, a storage medium I/F 203, a communication device 204, a hard disk 205, an input device 206, and a display 207. The hard disk 205 includes the "(e) line data with rendering order that has undergone a perpendicular line group deformation measure and a horizontal line group deformation measure" described below, a scanning instruction DB 210 storing scanning instructions generated from this data, and a control program 220 for controlling the laser oscillator 21 and the direction control motor 23 based on scanning instructions.

The CPU 201 reads the control program 220 from the hard disk 205 and executes the control program 220, and renders characters on the rewritable paper 14. The memory 202 is a volatile memory such as DRAM, and is used as a work area when the CPU 201 executes the control program 220. The input device 206 includes a mouse and a keyboard, which are used by the user for inputting instructions for controlling the laser radiating device 30. The display 207 is a user interface for displaying a GUI (Graphical User Interface) screen with a predetermined resolution and a predetermined number of colors based on screen information provided by the control program 220. For example, a field for inputting characters to be rendered on the rewritable paper 14 is displayed.

In the storage medium I/F 203, a recording medium 230 can be removably attached. The storage medium I/F 203 is used for reading data from the recording medium 230 and writing data in the recording medium 230. The control program 220 and the scanning instruction DB 210 are distributed by being stored in the recording medium 230, and are read from the recording medium 230 and installed in the hard disk 205. The control program 220 and the scanning instruction DB 210 may be downloaded from a predetermined server connected via a network.

The recording medium 230 is a non-volatile memory that is removable and portable, such as a Blu-ray disk, a compact disk, a DVD, an SD card, a multimedia card, and an xD card. The communication device 204 is, for example, an Ethernet card, a serial communication device (USB (Universal Serial Bus), IEEE 1394, Bluetooth (registered trademark), and is used for sending a scanning instruction to the laser oscillator 21 and the direction control motor 23.

Functional Block

FIG. 5 is a functional block diagram of the image processing device 100. The image processing device 100 includes a horizontal line group extracting unit 31, a horizontal line deformation measure unit 32, a perpendicular line extracting unit 33, and a perpendicular line deformation measure unit 34. To the image processing device 100, a "(a) line data group with rendering order" described below is provided. The line data group with rendering order may be stored in the HDD 104 beforehand, or may be distributed by being stored in the recording medium 121, or may be provided from a terminal (not shown) via the network I/F 105.

The horizontal line group extracting unit 31 extracts lines that are overlapping and close to each other in the horizontal direction, from a line data group with rendering order, and generates "(b) line data with horizontal line group flag and rendering order". The horizontal line deformation measure unit 32 generates "(c) line data with rendering order that has undergone a horizontal line group deformation measure" in which a deformation measure has been performed on horizontal lines, from the line data with horizontal line group flag and rendering order. The perpendicular line extracting unit 33 extracts lines that are overlapping and close to each other in the perpendicular (vertical) direction, from the line data with rendering order that has undergone a horizontal line group deformation measure, and generates "(d) line data with perpendicular line group flag and rendering order that has undergone a horizontal line group deformation measure". The perpendicular line deformation measure unit 34 generates "(e) line data with rendering order that has undergone a perpendicular line group deformation measure and a horizontal line group deformation measure", generated by performing a deformation measure on perpendicular (vertical) lines in the line data with a perpendicular line group flag and rendering order that has undergone a horizontal line group deformation measure. The line data with rendering order that has undergone a perpendicular line group deformation measure and a horizontal line group deformation measure, which has been generated by the perpendicular line deformation measure unit 34, is provided to the writing control device 20. Either the process on the horizontal line group or the process on the perpendicular line group may be performed first.

Overall Operating Procedure

FIG. 6 is a flowchart of a procedure for performing horizontal and perpendicular deformation measures.

The image processing device 100 reads a line data group with rendering order of a character or a figure that is the rendering object (step S100).

The horizontal line group extracting unit 31 of the image processing device 100 extracts a group of horizontal lines that are close to each other, from the line data group with rendering order (step S200). Accordingly, "(b) line data with horizontal line group flag and rendering order" is obtained, in which ON or OFF is registered in the horizontal ON/OFF flag and ON or OFF is registered in the non-render candidate flag.

Next, the horizontal deformation measure unit 32 of the image processing device 100 performs a deformation measure process for a horizontal line group, on the "(b) line data with horizontal line group flag and rendering order" (step S300). Accordingly, the "(c) line data with rendering order that has undergone a horizontal line group deformation measure" is obtained.

The perpendicular line extracting unit 33 of the image processing device 100 extracts a group of perpendicular lines that are close to each other, from the "(c) line data with rendering order that has undergone a horizontal line group deformation measure" (step S400). Accordingly, the "(d) line data with perpendicular line group flag and rendering order that has undergone a horizontal line group deformation measure" is obtained, in which ON or OFF is registered in the perpendicular ON/OFF flag and ON or OFF is registered in the non-render candidate flag.

Next, the perpendicular line deformation measure unit 34 of the image processing device 100 performs a deformation measure process for a perpendicular line group, on the (d) line data with perpendicular line group flag and rendering order that has undergone a horizontal line group deformation measure" (step S500). Accordingly, the "(e) line data with rendering order that has undergone a perpendicular line group deformation measure and a horizontal line group deformation measure" is obtained. The order of performing the processes of S200 and S400 may be reversed.

Subsequently, the "(e) line data with rendering order that has undergone a perpendicular line group deformation measure and a horizontal line group deformation measure" is sent to the writing control device 20. The writing control device 20 generates a scanning instruction (step S600), and drives the laser radiating device 30 to render a character, etc. (step S700).

Line Data with Horizontal Line Group Flag and Rendering Order

Figure 7A:
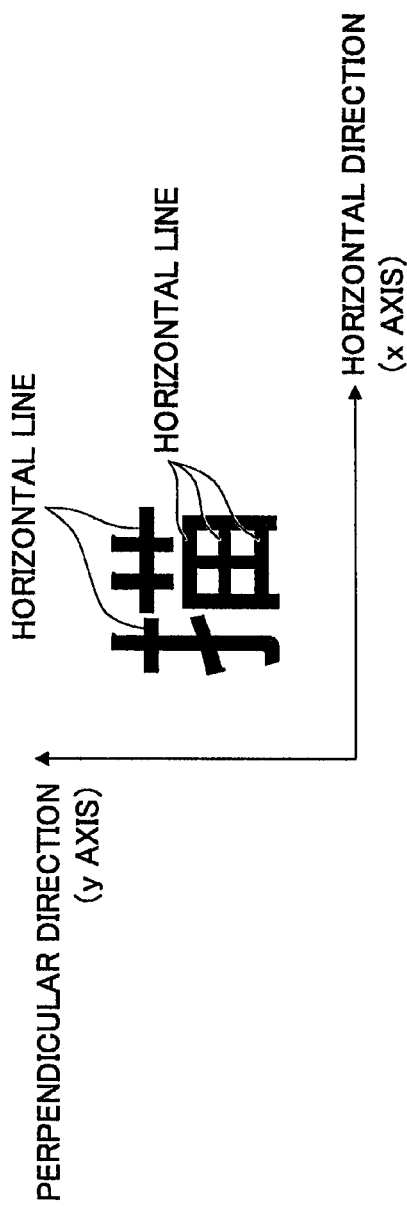
FIGS. 7A through 7D illustrate the process of extracting, from line data, horizontal lines that are overlapping each other in the horizontal direction and close to each other.

FIGS. 7A through 7D illustrate the process of creating "line data with horizontal line group flag and rendering order" from "line data with rendering order". A Japanese kanji character "byou" is taken as an example of a line data group with rendering order. As shown in FIG. 7A, coordinate axes in the horizontal direction (x axis) and the perpendicular direction (y axis) are set. The horizontal lines in the character substantially match the horizontal direction. The horizontal direction and the perpendicular direction may be reversed.

Figure 7B:

FIG. 7B is for describing the method of determining whether a line is a horizontal line. The horizontal line group extracting unit 31 determines that a line is horizontal, when an angle $\theta 1$ between the line and the x axis is less than or equal to a predetermined value. The angle $\theta 1$ between the line and the x axis is not included in the line data group with rendering order, and therefore, the horizontal line group extracting unit 31 obtains, for each line, a straight line passing through the start point and the end point of the line. Accordingly, the tilt of the straight line is obtained, and it can be determined whether the line is horizontal based on whether the tilt is less than or equal to a predetermined value.

By the above method, the horizontal line group extracting unit 31 extracts only lines that are determined as horizontal lines, from the line data group with rendering order of the character "byou". The horizontal line group extracting unit 31 sets the "horizontal ON/OFF flag" of the line data of these lines to "ON".

Figure 7C:
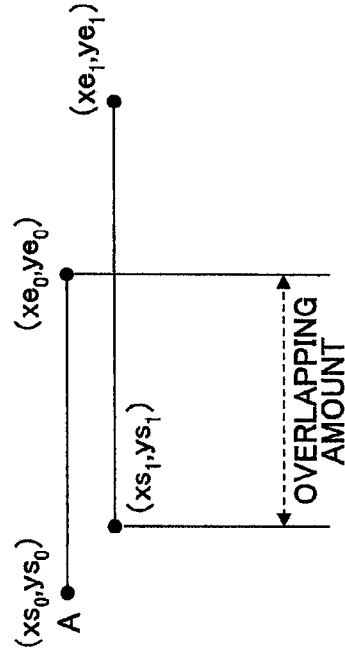

FIG. 7C illustrates the extraction of lines overlapping in the horizontal direction. For example, the horizontal line group extracting unit 31 determines one target line whose horizontal ON/OFF flag is "ON". Then, the horizontal line group extracting unit 31 sequentially extracts lines whose horizontal ON/OFF flag is "ON", which have a rendering order that is after the target line whose horizontal ON/OFF flag is "ON". The horizontal line group extracting unit 31 calculates the length between two end points of the target line and each of these extracted lines. The horizontal line group extracting unit 31 sets $(x_{s0}, y_{s0})$ $(x_{e0}, y_{e0})$ as the two coordinates of the target line whose horizontal ON/OFF flag is "ON", and sets $(x_{s1}, y_{s1})$ $(x_{e1}, y_{e1})$ as the two coordinates of a line whose horizontal ON/OFF flag is "ON" to be compared with the target line. In the case of FIG. 7C, the relationship of $x_{s0} > x_{s1} > x_{e0}$ is satisfied, and therefore the overlapping amount of the lines is expressed as follows.

Overlapping amount=$|x_{s1}-x_{e0}|$

Similarly, when the relationship of $x_{s0} > x_{e1} > x_{e0}$ is satisfied, the overlapping amount of the lines is expressed as follows.

Overlapping amount=$|x_{s0}-x_{e1}|$

When the relationship of $x_{s0} > x_{s1} > x_{e1} > x_{e0}$ is satisfied, the overlapping amount of the lines is expressed as follows.

Overlapping amount=$|x_{s1}-x_{e1}|$

When the relationship of $x_{s1} > x_{s0} > x_{e0} > x_{e1}$ is satisfied, the overlapping amount of the lines is expressed as follows.

Overlapping amount=$|x_{s0}-x_{e0}|$

The horizontal line group extracting unit 31 compares this overlapping amount with a threshold 1. When the overlapping amount is less than or equal to the predetermined threshold 1, there is no deformation of the character caused by the overlap, and therefore the overlapping amount can be disregarded. However, when the overlapping amount is greater than or equal to the predetermined threshold 1, deformation of the character caused by the overlap increases, and the legibility of the character decreases. In this case, this character becomes a target for performing the deformation measure process described below. The deformation measure process may be performed every time an overlap is found, without making the comparison with the threshold 1.

The horizontal line group extracting unit 31 fixes the target line whose horizontal ON/OFF flag is "ON", and performs a similar comparison with all lines whose horizontal ON/OFF flag is "ON" having a rendering order that is after the target line. When the comparison with all lines whose horizontal ON/OFF flag is "ON" having a rendering order that is after the target line is completed, the target line whose horizontal ON/OFF flag is "ON" is set to be another line, and then a similar comparison with all lines whose horizontal ON/OFF flag is "ON" having a rendering order that is after the new target line is performed. When all lines whose horizontal ON/OFF flag is "ON" have been set as the target line, the process ends.

Figure 7D:
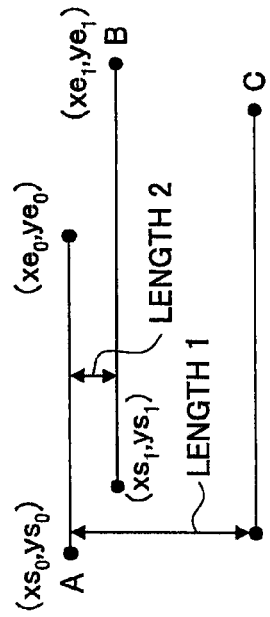

FIG. 7D illustrates the extraction of lines that are close to each other. For example, the horizontal line group extracting unit 31 calculates the length in the perpendicular direction between two end points of a pair of lines whose horizontal ON/OFF flag is "ON" for which the overlapping amount has been calculated (length 1 and length 2). The length in the perpendicular direction is to be calculated only for lines whose horizontal ON/OFF flag is "ON" that are determined to be overlapping in the horizontal direction.

Length 1=$|y_{s0}-y_{s1}|$

Length 1=$|y_{e0}-y_{e1}|$

The horizontal line group extracting unit 31 compares the shorter length of length 1 and length 2 with a threshold 2. When the shorter length is less than or equal to the threshold 2, the horizontal line group extracting unit 31 determines that the target line whose horizontal ON/OFF flag is "ON" and the line whose horizontal ON/OFF flag is "ON" compared with the target line are close to each other. Another method is to set a perpendicular line from the center of the target line to another line, and calculate the length between the target line and the other line. Another method is to set several perpendicular lines from the target line to another line, and calculate the average length of the several lengths between the target line and the other line.

The horizontal line group extracting unit 31 fixes the target line whose horizontal ON/OFF flag is "ON", and performs a similar comparison with all lines whose horizontal ON/OFF flag is "ON" that have a rendering order that is after the target line and that are determined to be overlapping the target line in the horizontal direction. When the comparison with lines whose horizontal ON/OFF flag is "ON" is completed, the target line whose horizontal ON/OFF flag is "ON" is set to be another line, and then a similar comparison with all lines whose horizontal ON/OFF flag is "ON" having a rendering order that is after the new target line is performed. When all lines whose horizontal ON/OFF flag is "ON" have been set as the target line, the process ends.

The horizontal line group extracting unit 31 sets the non-render candidate flag to "ON" for a line whose horizontal ON/OFF flag is "ON" that has been determined to be overlapping the target line in the horizontal direction and close to the target line. Line data with rendering order in which "ON" or "OFF" is set for the non-render candidate flag is the "line data with horizontal line group flag and rendering order".

FIG. 8 illustrates the line data group with a horizontal line group flag and rendering order. For example, data of all lines (an N number of lines in FIG. 8) constituting the character "byou" is included. In this line data with rendering order, the rendering order is already defined, and the character is rendered in the order as illustrated in FIG. 8. For example, the rendering order is defined so that the idle running length of the laser beam is minimized. According to need, the rendering order may be defined at this stage.

First, in FIG. 8 (*a*), the (a) line data group with rendering order is input to the image processing device 100. Each line data item includes a "laser scanning speed: S", a "laser power value: P", a start point x coordinate: $x_{s1}$", a start point y coordinate: $y_{s1}$", an "end point x coordinate: $x_{e1}$", and an "end point y coordinate: $y_{e1}$". Several flags are associated with the initial line data group with rendering order.

FIG. 8(*b*) illustrates an example of (b) line data with horizontal line group flag and rendering order. The (b) line data with horizontal line group flag and rendering order includes a "horizontal ON/OFF flag". When the horizontal line group extracting unit 31 determines that a line is horizontal with respect to the x axis, the "horizontal ON/OFF flag" is set as "ON" for this line.

Then, with respect to a target line whose horizontal ON/OFF flag is "ON", the horizontal line group extracting unit 31 determines whether a line overlaps the target line in the horizontal direction and is close to the target line. For a line that is determined to be overlapping the target line in the horizontal direction and close to the target line whose horizontal ON/OFF flag is "ON", the non-render candidate flag is set as "ON". An N number of non-render candidate flags are associated with each line because for each line compared with the target line whose horizontal ON/OFF flag is "ON", the non-render candidate flag may be either "ON" or "OFF". For example, when a line A1 is the target line, it is determined, for each of lines A2 through AN, whether the line overlaps the target line A1 in the horizontal direction and whether the line is close to the target line A1. Therefore, for each of the lines A2 through AN, the non-render candidate flag may be either "ON" or "OFF". When the line A1 is the target flag, it is not determined whether line A1 overlaps line A1 in the horizontal direction or whether line A1 is close to line A1. Therefore, the actual number of non-render candidate flags is N−1. The same applies to other lines.

FIG. 9 is a flowchart of a procedure of setting a non-render candidate flag to "ON" performed by the horizontal line group extracting unit 31.

The horizontal line group extracting unit 31 reads the line data group with rendering order (step S10).

The horizontal line group extracting unit 31 extracts lines that are horizontal with respect to the x axis from the line data group with rendering order (step S20). Accordingly, the horizontal ON/OFF flag is set as ON or OFF for the line data of N lines.

The horizontal line group extracting unit 31 determines whether all lines whose horizontal ON/OFF flag is "ON" have been target lines (step S30). When all lines whose horizontal ON/OFF flag is "ON" have been target lines (YES in step S30), the procedure of FIG. 9 is ended.

When all lines whose horizontal ON/OFF flag is "ON" have not been target lines (NO in step S30), the horizontal line group extracting unit 31 specifies the next line whose horizontal ON/OFF flag is "ON" as the target line in the rendering order (step S40).

Then, the horizontal line group extracting unit 31 calculates the overlapping amount between the target line whose horizontal ON/OFF flag is "ON" and the line whose horizontal ON/OFF flag is "ON" having a rendering order that is after the target line (step S50).

The horizontal line group extracting unit 31 determines whether the overlapping amount is less than or equal to a threshold 1 (step S60). When the overlapping amount is less than or equal to a threshold 1 (YES in step S60), the horizontal line group extracting unit 31 calculates the lengths 1 and 2 between the target line and the line for which the overlapping amount has been calculated (step S70).

The horizontal line group extracting unit 31 selects the shorter one of the length 1 and the length 2, and determines whether the selected length is less than or equal to a threshold 2 (step S80). When the selected length is less than the threshold 2 (YES in step S80), the horizontal line group extracting unit 31 sets the non-render candidate flag to "ON" for the line determined as YES in steps S60 and S80 with respect to the target line whose horizontal ON/OFF flag is "ON" (step S90). For example, when line A1 is the target line, and line A2 is overlapping the target line A1 and is close to the target line A1, a "non-render candidate flag for line A1" in the line data of the line A2 is set as "ON".

The horizontal line group extracting unit 31 determines whether all lines whose horizontal ON/OFF flag is "ON" having a rendering order that is after the target line have been evaluated (step S100). When all lines having a rendering order that is after the target line have not been evaluated (NO in step S100), the process returns to step S50. When all lines having a rendering order that is after the target line have been evaluated (YES in step S100), the process returns to step S30.

Figure 10:
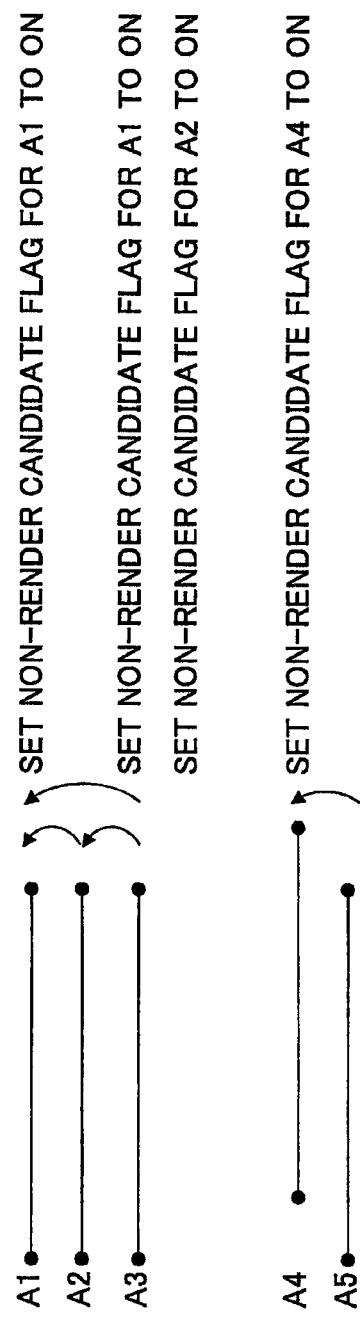
FIG. 10 illustrates the relationship between line data and a non-render candidate flag.

FIG. 10 illustrates the relationship between line data and a non-render candidate flag. FIGS. 11A through 12B are transition diagrams of the non-render candidate flag. As shown in FIG. 11A, the initial state of the non-render candidate flag is "OFF" (all lines are rendered).

It is assumed that there is a line data group with rendering order in which the horizontal ON/OFF flag is "ON". The number of lines is N=5.

When line A1 is the target line, it is determined that lines A2 and A3 are overlapping line A1 in the horizontal direction, and that lines A2 and A3 are close to line A1. Thus, the non-render candidate flags of lines A2 and A3 with respect to line A1 are set as "ON". As shown in FIG. 11B, in the line data of line A2, the "non-render candidate flag for line A1" is set as "ON". In the line data of line A3, the "non-render candidate flag for line A1" is set as "ON".

Next, with reference to FIG. 10, when line A2 is the target line, it is determined that line A3 is overlapping line A2 in the horizontal direction, and that line A3 is close to line A2. Thus, the non-render candidate flag of line A3 with respect to line A2 is set as "ON". As shown in FIG. 12A, in the line data for line A3, the "non-render candidate flag with respect to line A2" is set as "ON".

Next, with reference to FIG. 10, when line A3 is the target line, it is determined that there are no lines overlapping line A3 and no lines close to line A3.

Next, with reference to FIG. 10, when line A4 is the target line, it is determined that line A5 is overlapping line A4 in the horizontal direction, and that line A5 is close to line A4. Thus, the non-render candidate flag of line A5 with respect to line A4 is set as "ON". As shown in FIG. 12B, in the line data for line A5, the "non-render candidate flag with respect to line A4" is set as "ON".

By the above process, when a line is determined to be overlapping the target line and close to the target line at least once, at least one of the non-render candidate flags of this line is set to be "ON". The line whose non-render candidate flag is "ON" is thinned out, or rendered with decreased laser power P, or rendered at an increased laser scanning speed.

Deformation Measure Process

Figure 13:
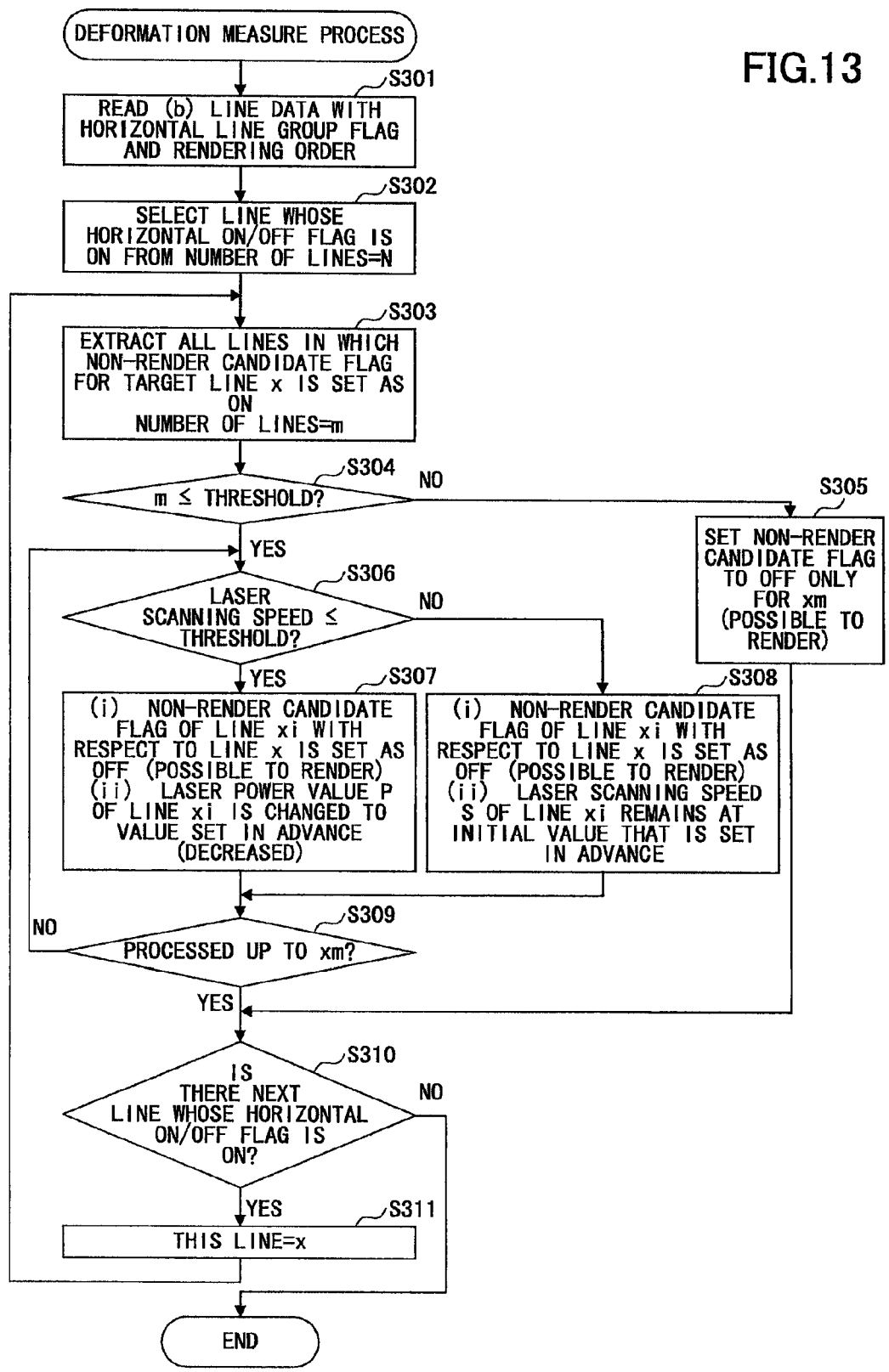
FIG. 13 is a flowchart of a procedure of a deformation measure process.

FIG. 13 is a flowchart of a procedure of a deformation measure process. Here, a description is given of an example where a deformation measure process of a horizontal line group is performed on "(b) line data with horizontal line group flag and rendering order". FIGS. 14A through 15B illustrate the setting of non-render candidate flags in the case of using the line data in FIG. 10.

The horizontal line deformation measure unit 32 reads the "(b) line data with horizontal line group flag and rendering order" (step S301).

Next, among the total number of lines=N, the horizontal line deformation measure unit 32 selects a line whose horizontal ON/OFF flag is "ON", and performs the following process on the selected line x (step S302).

The horizontal line deformation measure unit 32 extracts all lines in which the "non-render candidate flag for line x" is set as "ON" (step S303). The number of these extracted lines is m. A number is given to each of the m number of lines. The m number of lines xi with respect to the target line x are as follows.

line $xi = x1, x2, \ldots, x_m$

Next, the horizontal line deformation measure unit 32 determines whether m is less than or equal to a threshold (step S304). This threshold is a value used for determining whether the number m of lines whose "non-render candidate flag for line x" is set as "ON" is large or small. Therefore, the threshold may be about 1 through 3 lines. That is to say, the threshold is set such that when there is a large number m of lines whose non-render candidate flag is set as "ON", even if the lines are thinned out, the character can be recognized by a normal person.

Thus, when m is not less than or equal to the threshold (NO in step S304), it is determined that there is a sufficient number of lines whose horizontal ON/OFF flag is "ON", and therefore the horizontal line deformation measure unit 32 sets the non-render candidate flag as "OFF" only for $x_m$ (step S305). That is to say, the line $x_m$ is rendered. The lines x1 through $x_{m-1}$ between line x and line $x_m$ are not rendered (the non-render candidate flag remains as "ON"). According to m, the lines for which the non-render candidate flag is to be set as "OFF" and the number of such lines may be changed. For example, when m=4, lines $x_m$=x4, x2 are rendered. Accordingly, every other line is rendered, i.e., three lines x, x2, and x4 are rendered.

Meanwhile, when m is less than or equal to the threshold (YES in step S304), the following process is repeated for lines x1 through $x_m$.

The horizontal line deformation measure unit 32 determines whether the laser scanning speed of the laser radiating device 30 is less than or equal to a threshold (step S306). This threshold is set as the scanning speed at which residual heat hardly remains in the rewritable paper 14.

When the scanning speed of the laser radiating device 30 is less than the threshold (YES in step S306), it is difficult to set the scanning speed to a higher speed because the performance of the galvanometer mirror is low, and therefore the horizontal line deformation measure unit 32 performs the following process (step S307).

(i) The non-render candidate flag of the line xi with respect to the line x is set as "OFF" (possible to render).
(ii) The laser power value P of the line xi is changed to a value set in advance (decreased).

According to the above process, the line xi is rendered at a laser scanning speed S and by a laser power value P that is lower than an initial value.

When the laser scanning speed of the laser radiating device 30 is not less than or equal to the threshold (NO in step S306), the following process is performed (step S308).

(i) The non-render candidate flag of the line xi with respect to the line x is set as "OFF" (possible to render).
(ii) The laser scanning speed S remains at an initial value that is set in advance.

The laser scanning speed of the laser radiating device 30 is high, and therefore no particular changes are necessary. That is to say, the laser radiating device 30 renders the lines at this laser scanning speed, and therefore the lines are rendered at a scanning speed by which residual heat hardly remains. The laser scanning speed S of the line data may be set at the maximum scanning speed of the laser radiating device 30.

The horizontal line deformation measure unit 32 determines whether step S307 or S308 has been performed up to $x_m$ (step S309). When step S307 or S308 has not been performed up to $x_m$ (NO in step S309), the horizontal line deformation measure unit 32 repeats step S307 or S308 for the next line xi.

When step S307 or S308 has been performed up to $x_m$ (YES in step S309), the horizontal line deformation measure unit 32 determines whether there is a next line whose horizontal ON/OFF flag is "ON" (step S310). When there is a line x horizontal ON/OFF flag is "ON" (YES in step S310), the horizontal line deformation measure unit 32 sets this line as the target line x (step S311), and repeats steps S303 and onward.

Figure 14A:

FIG. 14A illustrates the setting of a non-render candidate flag when line A1 is the target line. For example, it is assumed that the threshold is "1" at step S304. When line A1 is the target line, the lines having a non-render candidate flag that is "ON" with respect to line A1 are the two lines A2 and A3. Thus, in this case, m=2, x1=A2, and $x_m$=x2=A3.

Accordingly, by performing the process of step S305, the non-render candidate flag of x2 (A3) is set as "OFF" and x2 (A3) is rendered. Meanwhile, the non-render candidate flag of x1 (A2) of x1 (A2) remains "ON" and therefore x1 (A2) is not rendered. It is determined whether the target line x is rendered according to the relationship with other lines; however, the non-render candidate flag of line A1 will not be "ON".

As described above, when there is a large number of lines whose non-render candidate flag is "ON", by rendering only the last line, character deformation can be prevented without significantly changing the shape of the character.

Figure 14B:
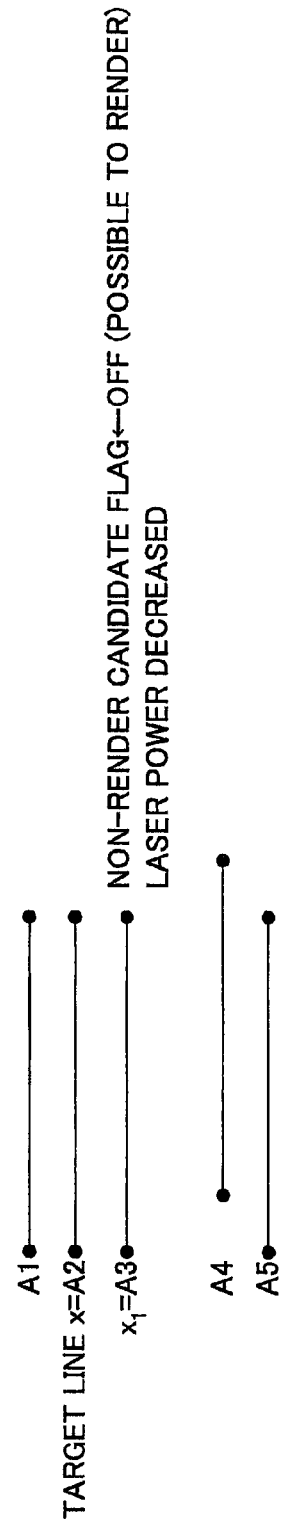

FIG. 14B illustrates the setting of a non-render candidate flag when line A2 is the target line. When line A2 is the target line, line A3 is the only line having a non-render candidate flag that is "ON" with respect to line A2. Therefore, according to the process of step S307 or S308, the non-render candidate flag of line x1 (A3) is set as "OFF" and line x1 (A3) is rendered. Furthermore, the laser power for line x1 (A3) is set to a lower value or the laser scanning speed for line x1 (A3) is set to a higher value.

Figure 14C:
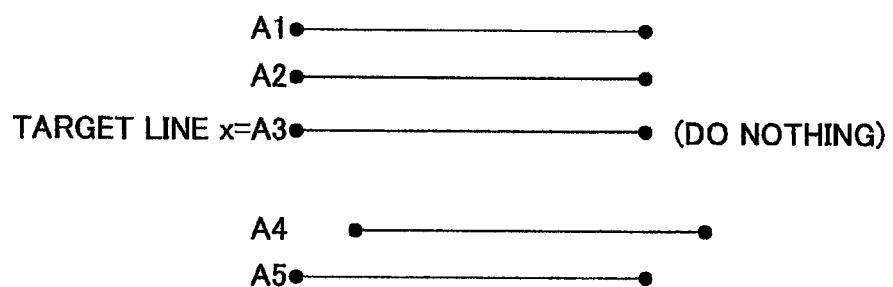

FIG. 14C illustrates the setting of a non-render candidate flag when line A3 is the target line. When line A3 is the target line, there is no line having a non-render candidate flag that is "ON" with respect to line A3. Therefore, the process of FIG. 13 is not performed, and no processes are performed on line x (A3).

FIG. 15A illustrates the setting of a non-render candidate flag when line A4 is the target line. When line A4 is the target line, line A5 is the line having a non-render candidate flag that is "ON" with respect to line A4. Therefore, according to the process of step S307 or S308, the non-render candidate flag of line x1 (A5) is set as "OFF" and line x1 (A5) is rendered. Furthermore, the laser power for line x1 (A5) is set to a lower value or the laser scanning speed for line x1 (A5) is set to a higher value.

FIG. 15B illustrates the setting of a non-render candidate flag when line A5 is the target line. When line A5 is the target line, there is no line having a non-render candidate flag that is "ON" with respect to line A5. Therefore, the process of FIG. 13 is not performed, and no processes are performed on line x (A5).

FIGS. 16A through 18 illustrate the transition of main parts of line data with rendering order. It is assumed that the line data with rendering order immediately before FIG. 16A is in the state of FIG. 12B.

FIG. 16A corresponds to the line data of FIG. 14A. In the line data of line A3, the "non-render candidate flag for line A1" is set to "OFF" from "ON".

FIG. 16B corresponds to the line data of FIG. 14B. In the line data of line A3, the "non-render candidate flag for line A2" is set to "OFF" from "ON". Furthermore, in this case, the laser power for the line data of line A3 is set to a lower value.

FIG. 17A corresponds to the line data of FIG. 14C. Line A3 has been set as the target line but no particular process is performed.

FIG. 17B corresponds to the line data of FIG. 15A. In the line data of line A5, the "non-render candidate flag for line A4" is set to "OFF" from "ON". Furthermore, in this case, the laser power for the line data of line A5 is set to a lower value.

FIG. 18 corresponds to the line data of FIG. 15B. Line A5 has been set as the target line but no particular process is performed.

As described above, the line data with rendering order, in which the non-render candidate flag and the laser power or laser scanning speed are set, corresponds to the "(c) line data with rendering order that has undergone a horizontal line group deformation measure". The "(e) line data with rendering order that has undergone a perpendicular line group deformation measure and a horizontal line group deformation measure" may be created in the same manner.

FIG. 19 illustrates an example of the (c) line data with rendering order that has undergone a horizontal line group deformation measure.

By performing step S305, several non-render candidate flags are set to "OFF" from "ON". Accordingly, it is determined that line data having a non-render candidate flag that finally remains "ON" is not rendered.

Furthermore, by performing step S307 or step S308, the laser power P or the laser scanning speed of each target line is changed.

Extraction of Lines in Perpendicular Direction

The procedure performed by the perpendicular line extracting unit 33 of extracting a perpendicular line from the (c) line data with rendering order that has undergone a horizontal line group deformation measure and setting the non-render candidate flag to "ON" is the same as the case of generating the (b) line data with horizontal line group flag and rendering order.

FIGS. 20A through 20D illustrate the extraction of perpendicular lines that are overlapping in the perpendicular direction and close to each other, from line data.

FIG. 20B illustrates the method of determining whether a line is a perpendicular line. When an angle $\theta_2$ between the y axis and a line is less than or equal to a predetermined value, the perpendicular line extracting unit 33 determines that the line is perpendicular. The angle $\theta_2$ between the line and the y axis is not included in the line data group with rendering order, and therefore the perpendicular line extracting unit 33 obtains, for each line, a straight line passing through the start point and the end point of the line. Accordingly, the tilt of the straight line is obtained, and it can be determined whether the line is perpendicular based on whether the tilt is greater than or equal to a predetermined value (that is to say, whether the tilt is near 90 degrees).

By the above method, the perpendicular line extracting unit 33 extracts only lines that are determined as perpendicular lines, from the line data with rendering order that has undergone a horizontal line group deformation measure of the character "byou". The perpendicular line extracting unit 33 sets the "perpendicular ON/OFF flag" of this line to "ON".

Figure 20C:
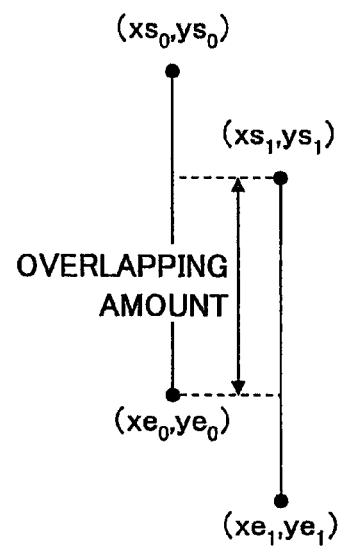

FIG. 20C illustrates the extraction of lines overlapping in the perpendicular direction. For example, the perpendicular line extracting unit 33 determines one target line whose perpendicular ON/OFF flag is "ON". Then, the perpendicular line extracting unit 33 sequentially extracts lines whose perpendicular ON/OFF flag is "ON", which have a rendering order that is after the target line whose perpendicular ON/OFF flag is "ON". The perpendicular line extracting unit 33 calculates the length between two end points of the target line and each of these extracted lines. The perpendicular line extracting unit 33 sets $(x_{s0}, y_{s0})$ $(x_{e0}, y_{e0})$ as the two coordinates of the target line whose perpendicular ON/OFF flag is "ON", and sets $(x_{s1}, y_{s1})$ $(x_{e1}, y_{e1})$ as the two coordinates of a line whose perpendicular ON/OFF flag is "ON" to be compared with the target line. In the case of FIG. 20C, the relationship of $y_{s0} > y_{s1} > y_{e0}$ is satisfied, and therefore the overlapping amount of the lines is expressed as follows.

Overlapping amount=$|y_{s1}-y_{e0}|$

Similarly, when the relationship of $y_{s0} > y_{e1} > y_{e0}$ is satisfied, the overlapping amount of the lines is expressed as follows.

Overlapping amount=$|y_{s0}-y_{e1}|$

When the relationship of $y_{s0} > y_{s1} > y_{e1} > y_{e0}$ is satisfied, the overlapping amount of the lines is expressed as follows.

Overlapping amount=$|y_{s1}-y_{e1}|$

When the relationship of $y_{s1} > y_{s0} > y_{e0} > y_{e1}$ is satisfied, the overlapping amount of the lines is expressed as follows.

Overlapping amount=$|y_{s0}-y_{e0}|$

The perpendicular line extracting unit 33 compares this overlapping amount with a threshold 3. When the overlapping amount is less than or equal to the predetermined threshold 3, there is no deformation of the character caused by the overlap, and therefore the overlapping amount can be disregarded. However, when the overlapping amount is greater than or equal to the predetermined threshold 3, deformation of the character caused by the overlap increases, and the legibility of the character decreases. In this case, this character becomes a target for performing the deformation measure process described below. The deformation measure process may be performed every time an overlap is found, without making the comparison with the threshold 3.

Figure 20D:
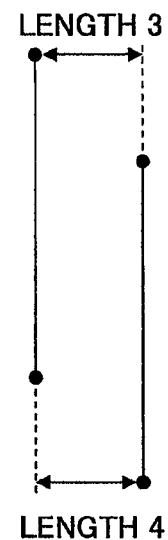

FIG. 20D illustrates the extraction of lines that are close to each other. For example, the perpendicular line extracting unit 33 calculates lengths 3 and 4 in the horizontal direction between two end points of a pair of lines whose perpendicular ON/OFF flag is "ON", for which the overlapping amount has been calculated and determined as less than or equal to the threshold 3.

The perpendicular line extracting unit 33 compares the shorter length of length 3 and length 4 with a threshold 4. When the shorter length is less than or equal to the threshold 4, the perpendicular line extracting unit 33 determines that the target line whose perpendicular ON/OFF flag is "ON" and the line whose perpendicular ON/OFF flag is "ON" compared with the target line are close to each other. The perpendicular line extracting unit 33 sets the non-render candidate flag to "ON" for a line that has been determined to be overlapping with the target line whose perpendicular ON/OFF flag is "ON" in the perpendicular direction and close to the target line.

As described above, the procedure of setting the non-render candidate flag to "ON" for the perpendicular direction is substantially the same as that for the horizontal direction. A non-render candidate flag is set for both the horizontal direction and the perpendicular direction. Therefore, for one line, two types of non-render candidate flags are set, i.e., a flag for the horizontal direction and a flag for the perpendicular direction.

FIG. 21 illustrates an example of (d) line data with perpendicular line group flag and rendering order that has undergone a horizontal line group deformation measure. The line data has undergone the horizontal line group deformation measure, and therefore the laser scanning speed S, the laser power P, and the ON/OFF of the non-render candidate flags with respect to the horizontal line group are determined. Furthermore, the perpendicular line extracting unit 33 has extracted the perpendicular line group, and therefore one line data includes a "horizontal ON/OFF flag" and a "perpendicular ON/OFF flag". If the "perpendicular ON/OFF flag" is "ON", the perpendicular line extracting unit 33 registers, for each line, an N number of non-render candidate flags corresponding to the number of lines.

In order to prevent a situation where both the "horizontal ON/OFF flag" and the "perpendicular ON/OFF flag" are "ON" for one line, the angle for determining that a line is horizontal (FIG. 7B) and the angle for determining that a line is perpendicular (FIG. 20B) are set.

FIG. 22 illustrates an example of the (e) line data with rendering order that has undergone a perpendicular line group deformation measure and a horizontal line group deformation measure. The perpendicular line extracting unit 33 has implemented the perpendicular line group deformation measure, and therefore the laser scanning speed S, the laser power P, and the ON/OFF of the non-render candidate flags with respect to the perpendicular line group are determined.

Generation of Scanning Instruction

The writing control device 20 generates a scanning instruction with the use of (e) line data with rendering order that has undergone a perpendicular line group deformation measure and a horizontal line group deformation measure. A line whose non-render candidate flag is ON does not need to be rendered, and therefore lines whose non-render candidate flag is ON are excluded from the rendering objects.

Figure 23:
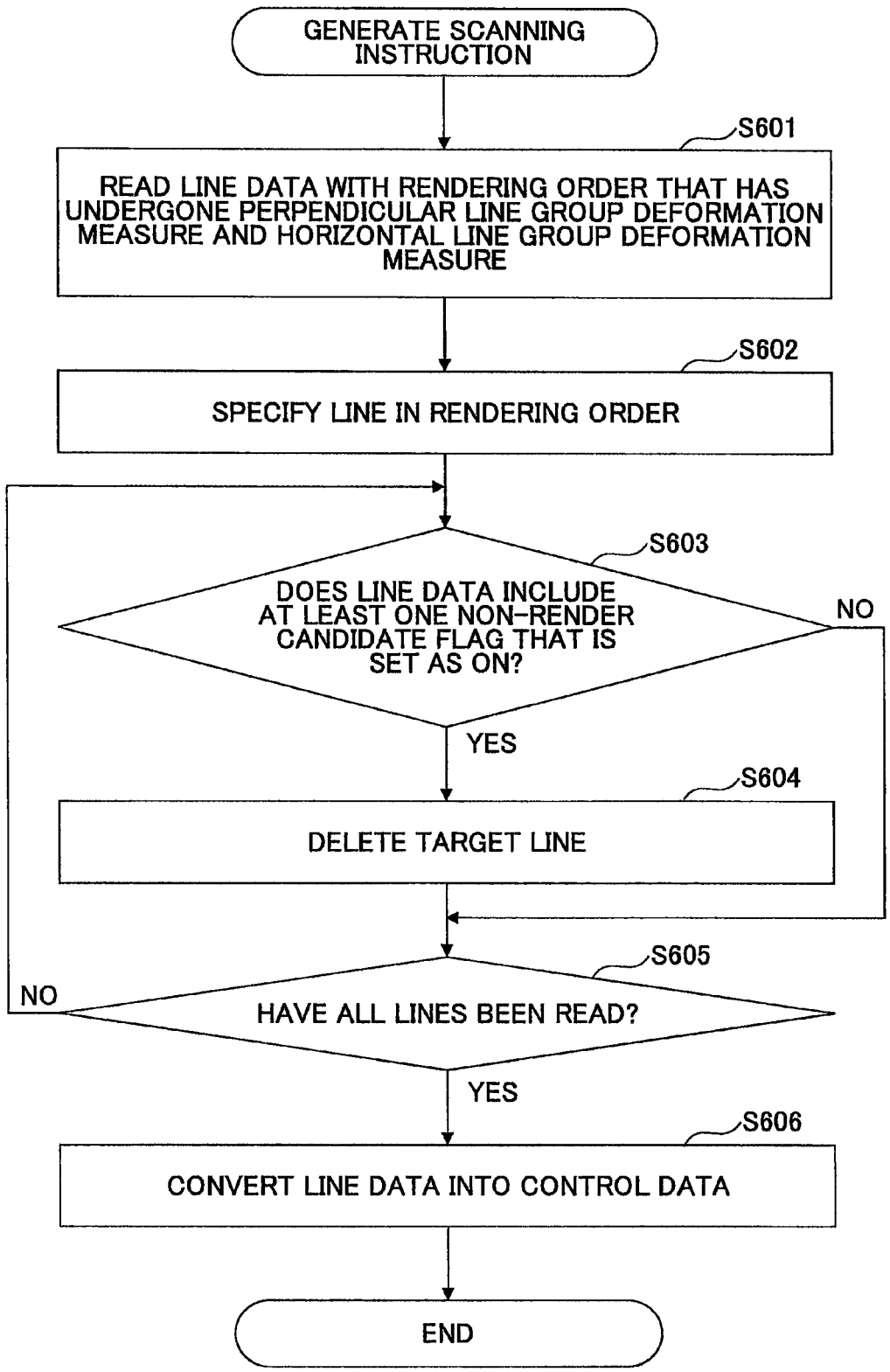
FIG. 23 is a flowchart indicating a procedure of generating a scanning instruction from the line data with rendering order that has undergone a perpendicular line group deformation measure and a horizontal line group deformation measure performed by the writing control device.
Figure 24:
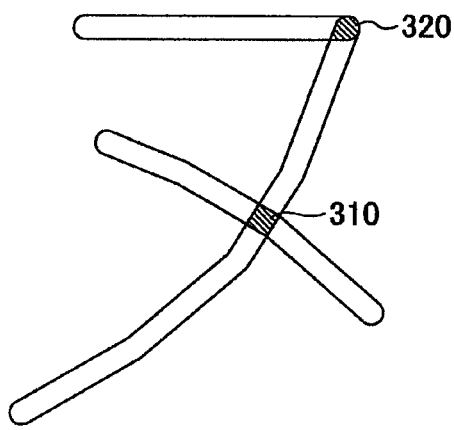
FIG. 24 illustrates an example of a character rendered on rewritable paper.

FIG. 23 is a flowchart indicating a procedure of generating a scanning instruction from the line data with rendering order that has undergone a perpendicular line group deformation measure and a horizontal line group deformation measure.

The writing control device 20 reads the line data with rendering order that has undergone a perpendicular line group deformation measure and a horizontal line group deformation measure (step S601).

The writing control device 20 specifies one line in the rendering order (step S602).

Then, the writing control device 20 determines whether there is at least one non-render candidate flag that is set as "ON" in the line data of the specified line (step S603). When there is a non-render candidate flag that is "ON" for one or more lines, the target line cannot be rendered.

Therefore, when there is at least one non-render candidate flag that is set as "ON" in the line data of the specified line (YES in step S603), the writing control device 20 deletes the target line (step S604).

The writing control device 20 determines whether all the line data has been read (step S605), and when all line data has not been read (NO in step S605), the writing control device 20 repeats the process of step S603.

When all line data has been read (YES in step S605), the writing control device 20 generates a scanning instruction by converting the line data into control data (step S606).

As described above, the laser writing system 12 according to the present embodiment can reliably prevent deformation by thinning out lines, when there are substantially parallel lines that are close to each other. Furthermore, by decreasing the laser power or by increasing the laser scanning speed, it is possible to prevent lines from contacting each other due to residual heat.

According to an embodiment of the present invention, an information processing apparatus is provided, by which a color is prevented from being formed due to residual heat between lines, so that the legibility is improved and the recording medium is prevented from deteriorating.

The information processing apparatus, the system, and the information processing method are not limited to the specific embodiments described herein, and variations and modifications may be made without departing from the scope of the present invention.

The present application is based on Japanese Priority Patent Application No. 2012-022349, filed on Feb. 3, 2012 and Japanese Priority Patent Application No. 2012-278094, filed on Dec. 20, 2012, the entire contents of which are hereby incorporated herein by reference.

What is claimed is:

1. An information processing apparatus for generating a scanning instruction to send to a device for forming visible information by scanning a recording medium with a laser beam, the information processing apparatus comprising:
a line extracting unit configured to read line information in which a scanning speed and a radiation output value of the laser beam are registered in advance for each of a plurality of lines, and extract, from the line information, all lines which are overlapping a target line in a line direction and which are positioned within a predetermined distance from the target line;
a scanning line adjusting unit configured to perform at least one process of
   removing, from a scanning object, at least one of the lines extracted by the line extracting unit,
   changing the radiation output value of at least one of the lines extracted by the line extracting unit to a value lower than an initial value, and
   changing the scanning speed of at least one of the lines extracted by the line extracting unit to a value greater than an initial value, and
   switching the process to be executed when rendering lines, according to the number of extracted lines.

2. The information processing apparatus according to claim 1, wherein
unless a number of the lines extracted by the line extracting unit is less than or equal to a threshold,
the scanning line adjusting unit
   sets, as the scanning object, only a line that is furthest away from the target line among the lines extracted by the line extracting unit, and
   removes, from the scanning object, a line that is before a line furthest away from a line closest to the target line.

3. The information processing apparatus according to claim 1, wherein
when a number of the lines extracted by the line extracting unit is less than or equal to a threshold,
the scanning line adjusting unit changes the radiation output value to a value lower than the initial value without removing any lines from the scanning object, when the initial value of the scanning speed in the line information is less than or equal to a threshold, and
the scanning line adjusting unit maintains the initial value of the scanning speed and the initial value of the radiation output value without removing any lines from the scanning object, when the initial value of the scanning speed in the line information is not less than or equal to the threshold.

4. The information processing apparatus according to claim 1, wherein
when a number of the lines extracted by the line extracting unit is less than or equal to a threshold,
the scanning line adjusting unit changes the radiation output value to a value lower than the initial value without removing any lines from the scanning object, when the initial value of the scanning speed in the line information is less than or equal to a threshold, and
the scanning line adjusting unit changes the scanning speed to a value greater than the initial value without removing any lines from the scanning object, when the initial value of the scanning speed in the line information is not less than or equal to the threshold.

5. The information processing apparatus according to claim 1, wherein
the scanning line adjusting unit registers flag information in association with each of the plurality of lines in the line information, wherein the flag information indicates whether a line for which the flag information is registered is to be removed from the scanning object with respect to each of other lines.

6. An information processing method performed by an information processing apparatus for generating a scanning instruction to send to a device for forming visible information by scanning a recording medium with a laser beam, the information processing method comprising:
reading line information in which a scanning speed and a radiation output value of the laser beam are registered in advance for each of a plurality of lines;
extracting, from the line information, all lines which are overlapping a target line in a line direction and which are positioned within a predetermined distance from the target line;
performing at least one process of
   removing, from a scanning object, at least one of the lines extracted at the extracting,
   changing the radiation output value of at least one of the lines extracted at the extracting to a value lower than an initial value, and
   changing the scanning speed of at least one of the lines extracted at the extracting to a value greater than an initial value, and
   switching the process to be executed when rendering lines, according to the number of extracted lines.

7. The information processing method of claim 6, wherein, unless a number of the lines extracted by the line extracting unit is less than or equal to a threshold,
   setting as the scanning object, only a line that is furthest away from the target line among the lines extracted by the line extracting unit, and
   removing, from the scanning object, a line that is before a line furthest away from a line closest to the target line.

8. The information processing method of claim 6, wherein, when a number of the lines extracted by the line extracting unit is less than or equal to a threshold,
   changing the radiation output value to a value lower than the initial value without removing any lines from the scanning object, when the initial value of the scanning speed in the line information is less than or equal to a threshold, and
   maintaining the initial value of the scanning speed and the initial value of the radiation output value without removing any lines from the scanning object, when the initial value of the scanning speed in the line information is not less than or equal to the threshold.

9. The information processing method of claim 6, wherein when a number of the lines extracted by the line extracting unit is less than or equal to a threshold,
   changing the radiation output value to a value lower than the initial value without removing any lines from the scanning object, when the initial value of the scanning speed in the line information is less than or equal to a threshold, and
   changing the scanning speed to a value greater than the initial value without removing any lines from the scanning object, when the initial value of the scanning speed in the line information is not less than or equal to the threshold.

10. The information processing method of claim 6, wherein
registering flag information in association with each of the plurality of lines in the line information, wherein the flag information indicates whether a line for which the flag information is registered is to be removed from the scanning object with respect to each of other lines.

11. A system for forming visible information by irradiating a recording medium with a laser beam, the system comprising:
a line extracting unit configured to read line information in which a scanning speed and a radiation output value of the laser beam are registered in advance for each of a plurality of lines, and extract, from the line information, all lines which are overlapping a target line in a line direction and which are positioned within a predetermined distance from the target line;

a scanning line adjusting unit configured to perform at least one process of
- removing, from a scanning object, at least one of the lines extracted by the line extracting unit,
- changing the radiation output value of at least one of the lines extracted by the line extracting unit to a value lower than an initial value, and
- changing the scanning speed of at least one of the lines extracted by the line extracting unit to a value greater than an initial value;

a laser radiating device configured to radiate the laser beam from a starting end to an ending end of a line based on the line information; and switching the process to be executed when rendering lines, according to the number of extracted lines.

12. The information processing apparatus of claim 11, wherein
   unless a number of the lines extracted by the line extracting unit is less than or equal to a threshold,
   the scanning line adjusting unit is configured to,
      set, as the scanning object, only a line that is furthest away from the target line among the lines extracted by the line extracting unit, and
      remove, from the scanning object, a line that is before a line furthest away from a line closest to the target line.

13. The information processing apparatus of claim 11, wherein,
   when a number of the lines extracted by the line extracting unit is less than or equal to a threshold,
      the scanning line adjusting unit is configured to change the radiation output value to a value lower than the initial value without removing any lines from the scanning object, when the initial value of the scanning speed in the line information is less than or equal to a threshold, and
      the scanning line adjusting unit is configured to maintain the initial value of the scanning speed and the initial value of the radiation output value without removing any lines from the scanning object, when the initial value of the scanning speed in the line information is not less than or equal to the threshold.

14. The information processing apparatus of claim 11, wherein
   when a number of the lines extracted by the line extracting unit is less than or equal to a threshold,
      the scanning line adjusting unit is configured to change the radiation output value to a value lower than the initial value without removing any lines from the scanning object, when the initial value of the scanning speed in the line information is less than or equal to a threshold, and
      the scanning line adjusting unit is configured to change the scanning speed to a value greater than the initial value without removing any lines from the scanning object, when the initial value of the scanning speed in the line information is not less than or equal to the threshold.

15. The information processing apparatus of claim 11, wherein
   the scanning line adjusting unit is configured to register flag information in association with each of the plurality of lines in the line information, wherein the flag information indicates whether a line for which the flag information is registered is to be removed from the scanning object with respect to each of other lines.

16. An information processing apparatus for generating a scanning instruction to send to a device for forming visible information by scanning a recording medium with a laser beam, the information processing apparatus comprising:
   a line extracting unit configured to read line information in which a scanning speed and a radiation output value of the laser beam are registered in advance for each of a plurality of lines, and extract, from the line information, all lines which are overlapping a target line in a line direction and which are positioned within a predetermined distance from the target line; and
   a scanning line adjusting unit configured to perform at least one of,
      remove, from a scanning object, at least one of the lines extracted by the line extracting unit,
      change the radiation output value of at least one of the lines extracted by the line extracting unit to a value lower than an initial value, and
      change the scanning speed of at least one of the lines extracted by the line extracting unit to a value greater than an initial value,
   wherein
      unless a number of the lines extracted by the line extracting unit is less than or equal to a threshold,
      the scanning line adjusting unit is further configured to,
         set, as the scanning object only a line that is furthest away from the target line among the lines extracted by the line extracting unit, and
         remove, from the scanning object, a line that is before a line furthest away from a line closest to the target line.

* * * * *